United States Patent
Buckley et al.

(10) Patent No.: US 10,477,607 B2
(45) Date of Patent: Nov. 12, 2019

(54) SYSTEM AND METHOD FOR VOICE SERVICE IN AN EVOLVED PACKET SYSTEM

(75) Inventors: Adrian Buckley, Tracy, CA (US); Jan Hendrik Lucas Bakker, Irving, TX (US); Stefano Faccin, Hayward, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 153 days.

(21) Appl. No.: 12/826,631

(22) Filed: Jun. 29, 2010

(65) Prior Publication Data
US 2010/0329244 A1   Dec. 30, 2010

Related U.S. Application Data

(60) Provisional application No. 61/221,509, filed on Jun. 29, 2009.

(51) Int. Cl.
*H04W 76/16* (2018.01)
*H04L 29/06* (2006.01)
*H04W 48/18* (2009.01)
*H04W 80/10* (2009.01)

(52) U.S. Cl.
CPC .......... *H04W 76/16* (2018.02); *H04L 65/105* (2013.01); *H04L 65/1016* (2013.01); *H04W 48/18* (2013.01); *H04W 80/10* (2013.01)

(58) Field of Classification Search
CPC .. H04L 65/1016; H04L 65/105; H04W 48/18; H04W 80/10; H04W 76/16
USPC ...... 370/328, 352, 356, 331, 332; 379/88.17
See application file for complete search history.

(56) References Cited

U.S. PATENT DOCUMENTS

| | | | |
|---|---|---|---|
| 6,567,667 B1 | 5/2003 | Gupta et al. | |
| 2005/0207336 A1 | 9/2005 | Choi et al. | |
| 2005/0261017 A1* | 11/2005 | Vaittinen et al. | 455/522 |
| 2007/0058789 A1* | 3/2007 | Lim et al. | 379/88.17 |
| 2007/0258570 A1 | 11/2007 | Selenius et al. | |
| 2008/0080480 A1* | 4/2008 | Buckley et al. | 370/352 |
| 2008/0267128 A1* | 10/2008 | Bennett et al. | 370/331 |

(Continued)

FOREIGN PATENT DOCUMENTS

| | | |
|---|---|---|
| CN | 1377559 | 10/2002 |
| CN | 1957591 | 5/2007 |

(Continued)

OTHER PUBLICATIONS

3rd Generation Partnership Project; Technical Specification Group Services and System Aspects; General Packet Radio Service (GPRS); Service Description; Stage 2 (Release 8); 3GPP Standard; 3GPP TS 23.060, Valbonne, France, V8.5.1, Jun. 2009, 278 pages.

(Continued)

*Primary Examiner* — Khaled M Kassim
(74) *Attorney, Agent, or Firm* — Fish & Richardson P.C.

(57) ABSTRACT

A system and method for enabling voice services using a network component in a communication system including a user equipment (UE) is provided. The UE is configured to receive a first message which may be a SIP request. The network component is configured to create a second message, or SIP request, based upon the first message. The network component further configured to subsequently receive a SIP response and select a subsequent action upon receiving the SIP response.

8 Claims, 20 Drawing Sheets

(56) References Cited

U.S. PATENT DOCUMENTS

| | | | |
|---|---|---|---|
| 2009/0003276 A1* | 1/2009 | Mutikainen et al. | 370/329 |
| 2009/0129342 A1* | 5/2009 | Hwang et al. | 370/331 |
| 2009/0154408 A1* | 6/2009 | Jeong et al. | 370/329 |
| 2009/0238143 A1* | 9/2009 | Mukherjee | H04W 36/0022 370/331 |
| 2009/0257418 A1* | 10/2009 | Allen et al. | 370/338 |
| 2009/0296660 A1* | 12/2009 | Weng | 370/332 |
| 2010/0034166 A1* | 2/2010 | Olvera-Hernandez | 370/331 |
| 2010/0069101 A1* | 3/2010 | Mandi et al. | 455/466 |
| 2010/0098023 A1* | 4/2010 | Aghili | H04W 36/0022 370/331 |
| 2010/0112980 A1* | 5/2010 | Horn et al. | 455/411 |
| 2010/0172347 A1* | 7/2010 | Zisimopoulos | 370/352 |
| 2010/0195643 A1* | 8/2010 | Kodali | H04W 48/18 370/352 |
| 2010/0215018 A1* | 8/2010 | Ejzak | 370/331 |
| 2010/0216465 A1* | 8/2010 | Mubarek et al. | 455/435.1 |
| 2010/0279648 A1* | 11/2010 | Song | H04W 4/22 455/404.1 |
| 2010/0303012 A1* | 12/2010 | Atarius et al. | 370/328 |
| 2010/0329243 A1 | 12/2010 | Buckley et al. | |
| 2011/0010768 A1* | 1/2011 | Barriga et al. | 726/11 |
| 2011/0013623 A1* | 1/2011 | Hu et al. | 370/353 |
| 2011/0085517 A1* | 4/2011 | Yu et al. | 370/331 |
| 2011/0306321 A1* | 12/2011 | Keller et al. | 455/411 |

FOREIGN PATENT DOCUMENTS

| | | |
|---|---|---|
| CN | 101375554 | 2/2009 |
| CN | 101394588 | 3/2009 |
| EP | 2157748 | 2/2010 |
| EP | 2285064 | 2/2011 |
| JP | 2008-092578 | 4/2008 |
| KR | 10-2007-0015843 | 2/2007 |
| WO | 2008155148 | 12/2008 |
| WO | 2009002114 | 12/2008 |
| WO | 2009/117588 | 9/2009 |

OTHER PUBLICATIONS

3rd Generation Partnership Project; Technical Specification Group Services and System Aspects; General Packet Radio Service (GPRS); Service Description; Stage 2 (Release 9); 3GPP Standard; 3GPP TS 23.060, Valbonne, France, V9.1.1, Jun. 2009, 283 pages.
3rd Generation Partnership Project; Technical Specification Group Services and System Aspects; Policy and charging control architecture (Release 8); 3GPP Standard; 3GPP TS 23.203, Valbonne, France, V8.6.0, Jun. 2009, 113 pages.
3rd Generation Partnership Project; Technical Specification Group Services and System Aspects; Policy and charging control architecture (Release 9); 3GPP Standard; 3GPP TS 23.203, Valbonne, France, V9.1.0, Jun. 2009, 116 pages.
3rd Generation Partnership Project; Technical Specification Group Services and System Aspects; Architectural requirements (Release 8); 3GPP Standard; 3GPP TS 23.221, Valbonne, France, V8.4.0, Jun. 2009, 46 pages.
3rd Generation Partnership Project; Technical Specification Group Services and System Aspects; Architectural requirements (Release 9); 3GPP Standard; 3GPP TS 23.221, Valbonne, France, V9.0.0, Jun. 2009, 46 pages.
3rd Generation Partnership Project; Technical Specification Group Services and System Aspects; Circuit Switched Fallback in Evolved Packet System; Stage 2 (Release 8); 3GPP Standard; 3GPP TS 23.272, Valbonne, France, V8.4.0, Jun. 2009, 48 pages.
3rd Generation Partnership Project; Technical Specification Group Services and System Aspects; Circuit Switched Fallback in Evolved Packet System; Stage 2 (Release 9); 3GPP Standard; 3GPP TS 23.272, Valbonne, France, V9.0.0, Jun. 2009, 50 pages.
3rd Generation Partnership Project; Technical Specification Group Services and System Aspects; IP Multimedia Subsystem (IMS) and centralized services; Stage 2 (Release 8); 3GPP Standard; 3GPP TS 23.292, Valbonne, France, V8.4.0, Jun. 2009, 71 pages.
3rd Generation Partnership Project; Technical Specification Group Services and System Aspects; IP Multimedia Subsystem (IMS) and centralized services; Stage 2 (Release 9); 3GPP Standard; 3GPP TS 23.292, Valbonne, France, V9.2.0, Jun. 2009, 105 pages.
3rd Generation Partnership Project; Technical Specification Group Services and System Aspects; General Packet Radio Service (GPRS) enhancements for Evolved Universal Terrestrial Radio Access Network (E-UTRAN) access (Release 8); 3GPP Standard; 3GPP TS 23.401, Valbonne, France, V8.6.0, Jun. 2009, 227 pages.
3rd Generation Partnership Project; Technical Specification Group Services and System Aspects; General Packet Radio Service (GPRS) enhancements for Evolved Universal Terrestrial Radio Access Network (E-UTRAN) access (Release 9); 3GPP Standard; 3GPP TS 23.401, Valbonne, France, V9.1.0, Jun. 2009, 234 pages.
3rd Generation Partnership Project; Technical Specification Group Core Network and Terminals; IP Multimedia (IM) Core Network (CN) subsystem Centralized Services (ICS); Stage 3 (Release 8); 3GPP Standard; 3GPP TS 24.292, Valbonne, France, V8.2.0, Jun. 2009, 142 pages.
3rd Generation Partnership Project; Technical Specification Group Core Network and Terminals; IP Multimedia (IM) Core Network (CN) subsystem Centralized Services (ICS); Stage 3 (Release 9); 3GPP Standard; 3GPP TS 24.292, Valbonne, France, V9.0.0, Jun. 2009, 164 pages.
M. Garcia-Martin, Ericcson, S. Veikkolainen, Nokia; Session Description Protocol (SDP) Extension for Setting Up Audio Media Streams Over Circuit-Switched Bearers in the Public Switched Telephone Network (PSTN); Internet-Draft, retrieved from Internet: <http://tools.ietf.org/id/draft-garcia-mmusic-sdp-cs-02.txt> Oct. 30, 2008, 20 pages.
M. Garcia-Martin, E. Hendrikson, Lucent, D. Mills; IETF RFC 3455; Private Header (P-Header) Extensions to the Session Initiation Protocol (SIP) for the 3rd-Generation Partnership Project (3GPP); Network Working Group; Retrieved from the Internet <http://www.ietf.org/rfc/rfc3455.txt> Jan. 2003, 44 pages.
J Rosenberg, H Schulzrinne, P. Kyzivat; IETF RFC 3840; Indicating User Agent Capabilities in the Session Initiation Protocol (SIP); Network Working Group; Retrieved from the Internet <http://tools.ietf.org/search/rfc3840> Aug. 2004, 73 pages.
Ericsson: "CS domain and IM CN Subsystem selection principals" 3GPP Draft; S2-094178_CR-0065, 23.221, REV8, 3rd Generation Partnership Project (3GPP), TSG SA WG2 Meeting #73, No. Tallinn; V.8.3.0, May 2009, 9 pages.
Motorola: "IMS Voice Session Supported Indication" 3GPP Draft; S2-094147_CR-0824, 23.060, REV5, 3rd Generation Partnership Project (3GPP), TSG SA WG2 Meeting #73, No. Tallinn; V.8.4.0, May 2009, 45 pages.
Motorola: "IMS Voice Session Supported Indication" 3GPP Draft; S2-094148_CR-0825, 23.060, REV5, 3rd Generation Partnership Project (3GPP), TSG SA WG2 Meeting #73, No. Tallinn; V.9.0.0, May 2009, 44 pages.
Nokia Siemens Networks, Nokia: "IMS voice Indication" 3GPP Draft; S2-094179_CR-0996, 23.401, REV4, 3rd Generation Partnership Project (3GPP), TSG-SA2 Meeting #73, No. Tallinn; V.8.5.0, May 2009, 20 pages.
Nokia Siemens Networks, Nokia: "IMS voice Indication" 3GPP Draft; S2-094180_CR-0997, 23.401, REV3, 3rd Generation Partnership Project (3GPP), TSG-SA2 Meeting #73, No. Tallinn; V.9.0.0, May 2009, 21 pages.
Voice Over LTE via Generic Access; Voice over LTE via Generic Access; Stage 2 Technical Specification; V.o.L.G.A. Standard; Stage 2, V0.2.0, Valbonne, France, V9.0.0, Apr. 2009, 74 pages.
Research in Motion: "Directing requests using the appropriate IP-CAN", 3GPP Draft, 3GPP TSG CT WG1 Meeting #59, Change Request, C1-092649, Los Angeles (USA), Jun. 22-26, 2009, 8 pages.
Research in Motion, Huawei: "Text for session setup", 3GPP Draft, 3GPP TSG WG1 Meeting #59, Change Request, C1-093068, Los Angeles (USA), Jun. 22-26, 2009, 4 pages.
"3rd Generation Partnership Project; Technical Specification Group Core Network and Terminals; Non-Access-Stratum (NAS) protocol

(56) References Cited

OTHER PUBLICATIONS for Evolved Packet System (EPS); Stage 3 (Release 8)", Technical Specification, 3GPP TS 24.301, V8.2.1, Jun. 2009, 252 pages.
Ericsson: "CS domain and IM CN Subsystem selection principles", 3GPP Draft, 3GPP TSG-SA WG2 Meeting #73, Change Request, S2-094178, Tallinn, Estonia, May 11-15, 2009, 10 pages.
Research in Motion: "Handling of UE's usage setting, voice setting and VoIMS indicator—24.301", 3GPP Draft, 3GPP TSG CT WG1 Meeting #59, Change Request, C1-092388, Los Angeles (USA), Jun. 22-26, 2009, 18 pages.
NEC: "Impacts on UE modes of operation from stage 2 principles for CS domain and IM CN Subsystem selection", 3GPP Draft, 3GPP TSG CT WG1 Meeting #59, Discussion, C1-092533, Los Angeles (USA), Jun. 22-26, 2009, 5 pages.
International Searching Authority, International Preliminary Report on Patentability, for international patent application serial No. PCT/US2010/040489, dated Jan. 4, 2012, 7 pages.
International Searching Authority, International Search Report and Written Opinion, issued in international patent application serial No. PCT/US2010/040489, dated Feb. 22, 2011, 10 pages.
International Searching Authority, International Preliminary Report on Patentability, for international patent application serial No. PCT/US2010/040500, dated Jan. 4, 2012, 7 pages.
International Searching Authority, International Search Report and Written Opinion, issued in international patent application serial No. PCT/US2010/040500, dated Feb. 22, 2011, 10 pages.
"3rd Generation Partnership Project; Technical Specification Group Core Network and Terminals; IP Multimedia (IM) session handling; IM call model; Stage 2 (Release 8)", Technical Specification, 3GPP TS 23.218, V8.4.0, Dec. 1, 2008, 65 pages.
Research in Motion: "Handling of UE's usage setting, voice setting and VoIMS indicator—24.301", 3GPP Draft, 3GPP TSG CT WG1 Meeting #59, Change Request, C1-092861 rev of C1-092388, Los Angeles (USA), Jun. 22-26, 2009, 10 pages.
IP Australia, "Patent Examination Report No. 1," issued in connection with corresponding application No. AU 2010273726, dated Jul. 12, 2013, 4 pages.
Canadian Intellectual Property Office, issued in connection with corresponding application No. CA 2,766,592, dated Jun. 26, 2013, 2 pages.
European Patent Office, "Communication pursuant to Article 94(3) EPC," issued in connection with corresponding application No. EP 10730667.2, dated May 15, 2013, 3 pages.
European Patent Office, "Communication pursuant to Article 94(3) EPC," issued in connection with corresponding application No. EP 10730667.2, dated Oct. 15, 2012, 3 pages.
Japanese Patent Office, "Notice of Reasons for Rejection" with English translation, issued in connection with corresponding application No. JP 2012-517875, dated Jun. 3, 2013, 10 pages.
Korean Intellectual Property Office, "Office Action" with English translation, issued in connection with corresponding application No. KR 10-2012-7002143, dated Jul. 31, 2013, 9 pages.
IP Australia, "Patent Examination Report No. 1," issued in connection with application No. AU 2010273723, dated Jul. 12, 2013, 4 pages.
European Patent Office, "Communication pursuant to Article 94(3) EPC," issued in connection with application No. EP 10730663.1, dated May 15, 2013, 3 pages.
European Patent Office, "Communication pursuant to Article 94(3) EPC," issued in connection with application No. EP 10730663.1, dated Oct. 15, 2012, 4 pages.
Japanese Patent Office, "Notice of Reasons for Rejection" with English translation, issued in connection with application No. JP 2012-517872, dated Feb. 6, 2013, 6 pages.
Japanese Patent Office, "Notice of Reasons for Rejection" with English translation, issued in connection with application No. JP 2012-517872, dated Aug. 7, 2013, 7 pages.
Korean Intellectual Property Office, "Office Action" with English translation, issued in connection with application No. KR 10-2012-7002139, dated Jul. 31, 2013, 8 pages.
ETSI TS 124 229 V8.8.0 (Jul. 2009), Digital cellular telecommunications system (Phase 2+); Universal Mobile Telecommunications System (UMTS); LTE; Internet Protocol (IP) multimedia call control protocol based on Session Initiation Protocol (SIP) and Session Description Protocol (SDP); Stage 3 (3GPP TS 24.229 version 8.8.0 Release 8), Jun. 8, 2009, 8 pages.
3GPP TS 24.301 V8.2.0 (Jun. 2009), 3rd Generation Partnership Project; Technical Specification Group Core Network and Terminals; Non-Access-Stratum (NAS) protocol for Evolved Packet System (EPS); Stage 3 (Release 8), Jun. 8, 2009, 8 pages.
United States Patent and Trademark Office, "Non-Final Office Action," issued in connection with U.S. Appl. No. 12/826,579, dated Oct. 23, 2012, 43 pages.
United States Patent and Trademark Office, "Final Office Action," issued in connection with U.S. Appl. No. 12/826,579, dated Jul. 17, 2013, 26 pages.
State Intellectual Property Office of China, "Office Action," issued in connection with application No. CN 201080038569.7, dated Feb. 25, 2014, 6 pages.
State Intellectual Property Office of China, "Office Action," issued in connection with application No. CN 201080038538.1, dated Feb. 25, 2014, 10 pages.
3GPP TSG CT WG1 Meeting #59, "Directing requests using the appropriate IP-CAN," 24.237 CR 0065, Rev. 1, 8.2.0, C1-092946, Jun. 22-26, 2009, Los Angeles, USA, 4 pages.
Korean Intellectual Property Office, "Notice of Allowance," issued in connection with application No. KR 10-2012-7002143, dated Mar. 24, 2014, 3 pages.
Mexican Institute of Industrial Property, "Office Action," issued in connection with application No. MX/a/2011/013981, dated Mar. 6, 2014, 7 pages.
IP Australia, "Notice of Acceptance," issued in connection with application No. AU 2010273726, dated Jul. 16, 2014, 2 pages.
Office Action issued in Chinese Application No. 201510427864.4 dated Sep. 4, 2017; 10 pages.
Office Action issued in Chinese Application No. 1510427864.6 dated May 24, 2018, 7 pages.
Indian Examination report in Indian Application No. 9863/CHENP/2011 dated Apr. 12, 2018, 5 pages.
Chinese Office Action issued in Chinese Application No. 201510427864.6 dated Dec. 24, 2018, 4 pages.
Office action issued in Indian Application No. 9863/CHENP/2011 dated Aug. 29, 2019, 4 pages.

* cited by examiner

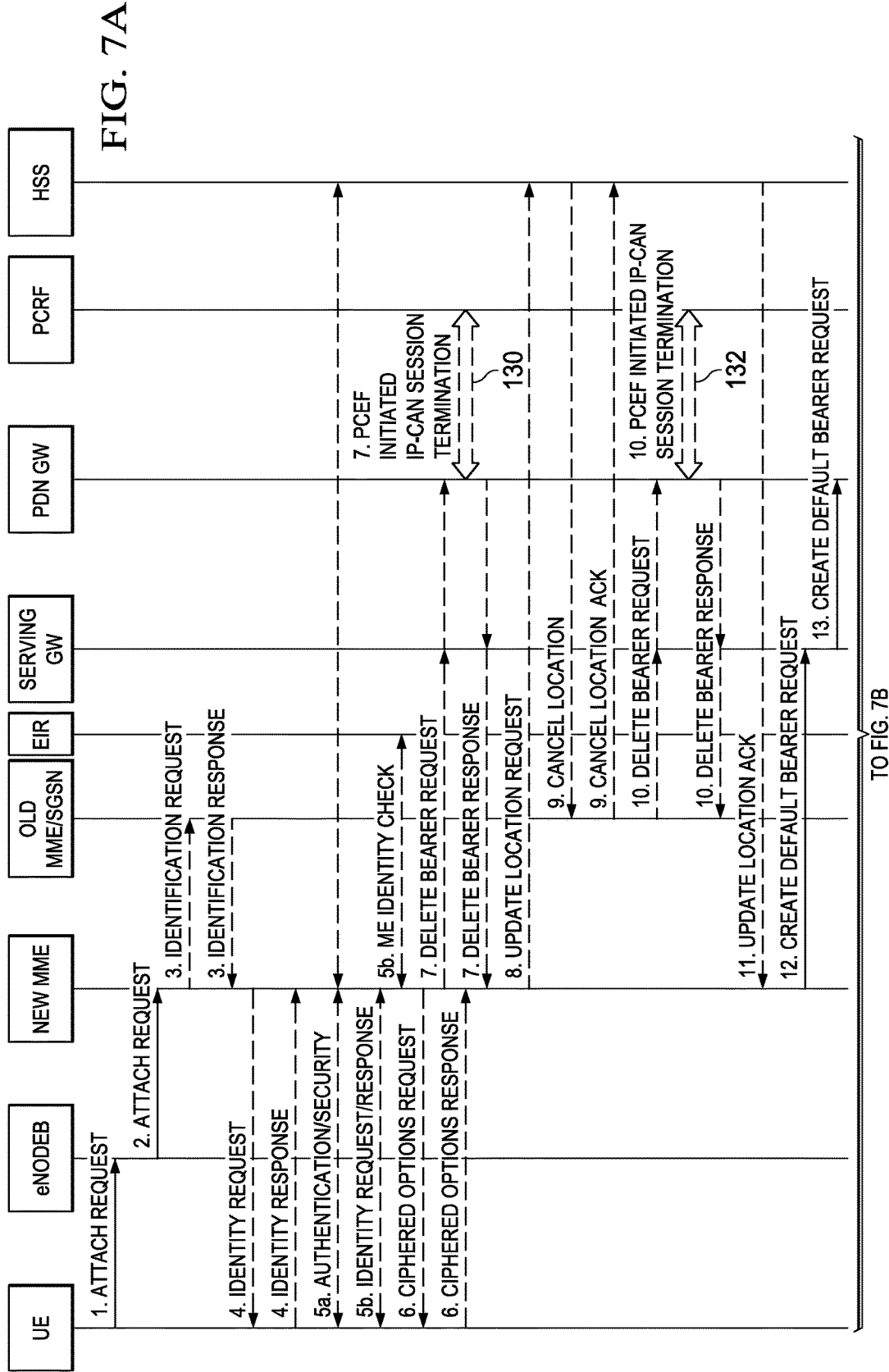

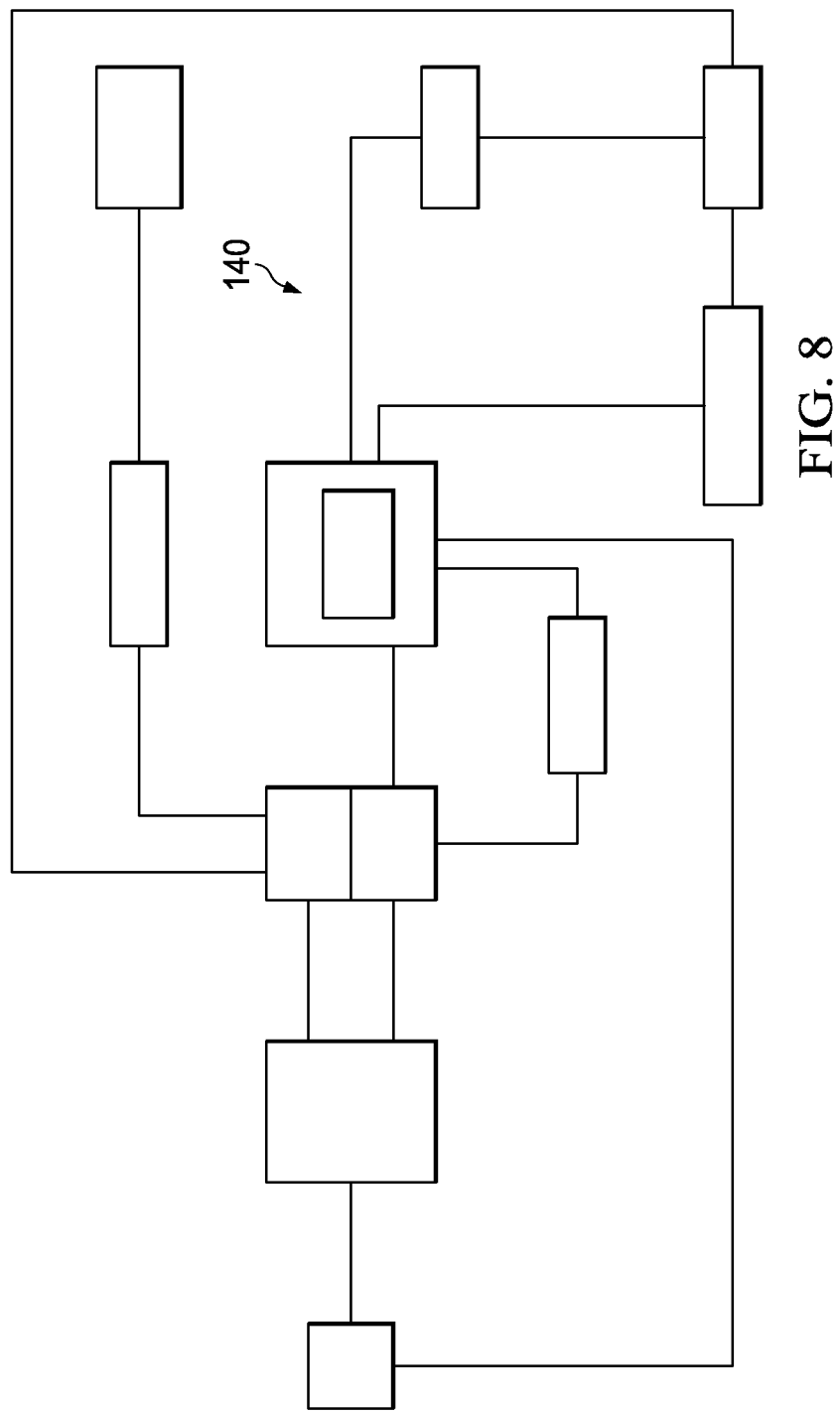

SYSTEM AND METHOD FOR VOICE SERVICE IN AN EVOLVED PACKET SYSTEM

CROSS-REFERENCE TO RELATED APPLICATION

This application claims the benefit of U.S. Provisional Patent Application No. 61/221,509 filed Jun. 29, 2009, the entire content of which is incorporated herein by reference.

FIELD OF TECHNOLOGY

The present disclosure relates generally to a method for enabling services using a network component in a communication system and more specifically to a method for providing voice services in an Internet Protocol Multimedia Subsystem (IMS), and also to a corresponding network element.

BACKGROUND

As used herein, the term "device" can refer to the terms "mobile station" (MS), "user agent" (UA), or "user equipment" (UE) which can include electronic devices such as fixed and mobile telephones, personal digital assistants, handheld or laptop computers, smart phones, printers, fax machines, televisions, set-top boxes, and other video display devices, home audio equipment and other home entertainment systems, home monitoring and control systems (e.g., home monitoring, alarm systems and climate control systems), enhanced home appliances such as computerized refrigerators and similar devices that have network communications capabilities. In some configurations, UE may refer to a mobile, wireless device.

UE may also refer to devices that have similar capabilities but that are not readily transportable, such as desktop computers, set-top boxes, TVs, IPTVs or network nodes.

The term device may also refer to a Session Initiation Protocol (SIP) User Agent (UA) that can be fixed or mobile. When a UA is a network node, the network node may act on behalf of another function, such as a UA or a fixed line device, and simulate or emulate the UA or fixed line device. For example, for some UAs, the Internet Protocol (IP) Multimedia Subsystem (IMS) SIP client that would typically reside on the device actually resides in the network and relays SIP message information to the device using optimized protocols. In other words, some functions that were traditionally carried out by a UA can be distributed in the form of a remote UA, where the remote UA represents the UA in the network.

The term "UE" can also refer to any hardware or software component that can terminate a communication session that could include, but is not limited to, a SIP session. Also, the terms "user agent," "UA," "user equipment," "UE," and "node" might be used synonymously herein. Those skilled in the art will appreciate that these terms can be used interchangeably within the application.

A UE may operate in a wireless communication network that provides high-speed data communications using various network configurations and/or Radio Access Technologies (RATs). For example, the UE may operate in accordance with Global System for Mobile Communications (GSM) and General Packet Radio Service (GPRS) technologies. Today, such a UE may further operate in accordance with Enhanced Data rates for GSM Evolution (EDGE), or Enhanced GPRS (EGPRS) or Enhanced GPRS Phase 2 (EGPRS2). Other wireless networks that UEs may operate include but are not limited to CDMA, UMTS, E-UTRAN, WiMax, and WLAN (e.g. IEEE 802.11). UEs may also operate in fixed network environments such as xDSL, DOCSIS cable networks, Ethernet or optical networks. Some UEs may be capable of multimode operation where they can operate on more than one access network technology either on a single access network technology at a time or in some devices using multiple access network technologies simultaneously.

In wireless telecommunications systems, transmission equipment in a base station transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" may refer to any component, such as a traditional base station, eNB, or other LTE access device, that can provide a UE with access to other components in a telecommunications system.

In Third Generation Partnership Project (3GPP) systems, voice services can be provided by a mobile operator via a series of means. Over GPRS/EDGE Radio Access Network (GERAN) and Universal Terrestrial Radio Access Network (UTRAN), for example, Circuit Switched (CS) infrastructure may be used to provide voice services. Alternatively, over GERAN and UTRAN, the IMS- or IP Core Network (CN) Multimedia Subsystem can be used. In that case, voice-over-IP or voice communication using IMS may be termed IMS voice over packet switched (PS). Furthermore, a hybrid solution where CS is used to provide the voice bearer and IMS is used to control the voice bearer can also be supported, this is know as IMS Centralised Services (ICS) and is defined in 3GPP TS 23.292 and 3GPP TS 24.292. Over (E-UTRAN), the IMS may be used. In some cases, voice services over LTE network (i.e. with the UE actively connected and exchanging data over an LTE network) may be provided using IMS.

Various Voice Service Indicators (VSIs) have been defined to indicate under what circumstances a particular network, network area or network cell may provide voice services. The indicators include the following values: "IMS Voice over PS session supported" (i.e., VoIMS Indicator), "Voice Centric" or "Data Centric", and "CS Voice only", "IMS PS voice only", "CS voice preferred, IMS voice secondary" or "IMS voice preferred, CS voice secondary". The VoIMS indicators may be provided by the network to the UE at each NAS registration (e.g. EPS attach) and NAS registration update while the "Voice Centric" or "Data Centric" indicators are within the UE. In some cases, an absence of the "IMS Voice over PS session supported" indicator may suggest the network (e.g., an eNodeB) is not optimized for voice. In some cases, however, voice may still be supported even though it may not be preferred. The preference could be specified as an operator preference, a user preference, a subscriber preference or combinations thereof. The user, the subscriber (e.g. enterprise) and/or the operator can manage the preferences. The preference can apply per access network, e.g. a different preference may exist for E-UTRAN when compared to another access network such as WIMAX or IEEE 802.11 based access networks. Such a preference may not be associated with each and every access network a UE supports. An operator's network elements may be aware of the preference such that voice calls are not delivered or terminated using a less preferred access network if preferred alternatives exist.

In the present disclosure, the VSIs may be categorized in several manners, including: Network provided VoIMS indicators (or IMS voice over PS (IMSVoPS) indicators), which are comparable to the above referenced "IMS Voice over PS sessions supported" indication, and a UE's usage settings may equate to the above-referenced "Voice Centric" or "Data Centric" VSIs. Voice Centric UEs may be able to use voice services, and therefore may attempt to obtain voice services independently of how the services may be provisioned. In contrast, Data Centric UEs may prefer to have the best possible PS (Packet Switched) services even when voice services are not available. For example, Data Centric UEs may prefer to stay in E-UTRAN, even when voice services are not available on the E-UTRAN. Voice services may be provided for Data Centric UEs depending on the operator's service scenario. Finally, a UE's voice settings may equate to the above-referenced "CS Voice Only", "IMS PS Voice Only", "CS Voice Preferred, IMS Voice Secondary", or "IMS Voice Preferred, CS Voice Secondary" VSIs. The following table (Table 1) summarizes these grouping and naming conventions.

used in this document for two purposes: (1) describing the act of registering a SIP UA with a SIP REGISTRAR, and (2) DESCRIBING THE ACT OF registering with lower layer (s). In SIP, when a UA is registered, typically a SIP REGISTER request was transmitted by the UA and a SIP 200 (OK) response is received by the UA. Alternatively, the UA may be registered via other means. In this document, we use the term "IMS register" if the UA is registered with a REGISTRAR function on a node or functional element that is an IMS node of functional element. Typically, the S-CSCF performs the role of REGISTRAR in IMS. At lower layers, e.g. at the NAS or Access Stratum layers, the UE registers with the network to obtain connectivity either by performing an Attach procedure to the GPRS network over UTRAN or GERAN, or an Attach with the EPC over LTE or E-UTRAN. Registration at NAS layer may also refer to the concept of Routing Area Update, Tracking Area Update (TAU), NAS Combined Attach and Combined TAU. It should be clear from the context which "register" applies, throughout this document.

Specifically, for the case where the operator is incrementally deploying LTE and has not deployed IMS, the CS fallback procedures allow a UE to: simultaneously attach to the PS core network (i.e. the 3GPP Evolved Packet Core (EPC)) and to the CS domain (i.e. the Mobile Switching Center (MSC)) by performing a combined Attach procedure at initial attach or a combined Tracking Area Update procedure in case of mobility; exchange data services over LTE

TABLE 1

| Generic Name of Indicator used in this Application | Name of Indicators in the Specifications | Ownership of indicators |
| --- | --- | --- |
| VoIMS indicator or IMS voice over PS indicator | "IMS Voice over PS session not supported" or "IMS Voice over PS session supported" | Set by Network. Provided by Network to UE at each NAS registration (e.g. EPS attach) and NAS registration update |
| UE usage settings | "Voice centric" or "Data centric" | Could be provisioned by Operator or could be changed by the UE for example as a result of user input. |
| UE voice settings | "CS Voice only" or "IMS PS voice only" or CS voice preferred, IMS voice secondary" or "IMS voice preferred, CS voice secondary" | Could be provisioned by Operator or could be changed by the UE for example as a result of user input. |

As wireless communication networks continue to evolve, in some network implementations there may be islands of coverage of LTE-type networks residing within a more complete radio coverage provided by GERAN and/or UTRAN. As such, various mechanisms for delivering voice services to a UE connected to an LTE network have been defined. For example, a CS fallback procedure allows a UE connected to a network using a first RAT, where the RAT provides only PS (Packet Switched) domain services, to also register simultaneously to another network that provides CS domain services. CS fallback may be used, for example, to trigger the UE to move to a cell of a network providing CS domain services and initiate voice calls, when, at the time of initiating the voice call, the UE was associated to a cell of a network that only provides PS domain services (i.e. no CS domain services). The UE initiating the voice call may be either idle or active on the cell of the network that only provides PS domain services. The term "register" has been while being capable of receiving incoming CS call notifications to trigger the UE to perform a handover to another RAT (GERAN or UTRAN) and continue the establishment of the CS call using the CS domain; and exchange data services over LTE while being capable of establishing outgoing CS calls by handing over to another RAT (GERAN or UTRAN) and performing the establishment of the CS call using the CS domain.

A UE may be configured to support voice service in a number of ways over an LTE. For example, the UE may support voice over IP solutions not provided by the network operator (e.g. Skype), CS fallback, IMS or Voice over LTE via Generic Access (VoLGA). As described above, there are a number of message tags for defining whether IMS is available over a particular LTE (e.g., VoIMS, SRVCC). Furthermore, a UE may be configured to select an initial or preferred voice solution based upon a pre-determined logic tree. If the initial voice solution is not available, the UE may be configured to react based upon pre-determined logic rules.

When a mobile terminated session is presented to the IMS network (e.g. including a node like the IMS Application Server (AS)), the node determines how to choose a target domain for the call delivery (i.e., CS Domain or PS Domain). A target domain may be defined as a result of IMS registration over the LTE network or the E-UTRAN, or by being configured with a CS target address, where the CS target address is provided e.g. as a result of a combined attachment procedure. In some cases, when registering, if the UE discovers that VoIMS or Single Radio Voice Call Continuity (SRVCC) are not supported, the UE may not include an indication such as an "audio" feature tag or an IMS Communication Service Identifier (ICSI) (e.g. the Multimedia Telephony (MMTel)) in its registration information. However, because an "audio" feature tag may describe more services than only bidirectional full duplex voice, the absence of the "audio" feature tag may deny the UE access to many more services such as streaming music or radio over IP. Similarly, absence of an MMTel ICSI may deny particular services (e.g. file transfer) in accordance with MMTel specifications. Note that the acronym "AS" has been used in this document for two purposes: (1) identifying node or functional element "application server", and (2) identifying "access stratum". In SIP, when a UA requests a service, and another UA renders or provides the service, typically a SIP request message was transmitted by the UA to another UA. The other UA can be hosted on a node or functional element called "application server" in IMS. Typically, an I-CSCF or S-CSCF or E-CSCF routes a request to an application server. It should be clear from the context which "AS" acronym applies, throughout this document.

Generally, the IMS AS, after receipt of an IMS registration message, is not aware of whether the LTE access can support voice services. The IMS AS may then rely upon other information rather than the information contained in IMS registration message to determine how the session (including voice) should be routed or whether the UE should be given the option to determine how the session (including voice) should be routed. If the UE is given the option to determine how the session (including voice) should be routed, the UE determines how to respond upon receipt of a SIP INVITE with an offer for a mobile terminated call or one including voice. In the present disclosure, the IMS AS may be a Service Centralization and Continuity Application Server (SCC AS).

In view of changing standards, a UE may receive an indication that certain services are supported while connected to a RAT, e.g. an "IMS Voice over PS session supported" indication when connected to GPRS or LTE/EPC/E-UTRAN received upon performing Attach, Tracking area update, Routing Area Update or combined attach procedures. Due to performing a registration area update procedure, the "indication that certain services are supported" may change. As a result, if the UE receives services (as provisioned for the subscriber) from the IMS domain and has also registered, the UE may not be capable of obtaining some services offered by the IMS domain and authorized as part of the subscription on the access network depending on the present value of the "indication that certain services are supported".

In some instances, problems relate to the delivery of services (e.g. a Mobile-Terminated voice call) to the UE depending on how services are provided to the UE, the value of the VoIMS Indicator, and the UE usage and voice settings.

In particular, the problem may apply to scenarios where the UE can receive the services over a variety of RATs and voice solutions, and the RAT the UE prefers (e.g. the RAT determined to be preferable based on policies in the UE) does not support the service/feature required. Note that, in some cases, the RAT that the UE prefers is never defined.

For example, a UE may be registered with IMS, over LTE or using E-UTRAN in an area where VoIMS is not available as indicated by the VoIMS Indicator. Similarly, SRVCC may be unavailable; the SRVCC flag may not be set. If the VoIMS Indicator is not supported, no indication may be made available by the network or made available by lower layers in the UE. In that case, the UE may be unable to determine before performing IMS registration, or after IMS registration but before establishing an IMS voice (VoIMS) session, whether VoIMS is supported. The absence of the VoIMS indicators may imply by default that VoIMS either is or isn't supported.

As such, upon IMS registration, the UE may be unable to indicate to the IMS infrastructure whether the UE intends to use IMS for voice services. Furthermore, even assuming that the UE is configured to indicate to the IMS (e.g. upon registration) whether it intends to use IMS for "voice" services or just for "non-voice" services (e.g. when the UE desires "voice" and "non-voice" services but the VoIMS indicator was not present or indicated that VoIMS is not available), it may be unclear how Mobile-Terminated calls incoming to the IMS are delivered when the UE is camping on a PS RAT (e.g. LTE), or how calls can be routed to the UE over the CS domain. Accordingly, it may be unclear as to whether calls are routed to the UE using IMS over the PS RAT in the PS domain or whether calls are routed through the CS domain.

In a UE where the UE IMS or SIP stack has no access to the indications that were provided by the NAS regarding the value of the VoIMS indicator, the UE does not know whether the UE can receive or initiate IMS voice in certain areas. In some cases, the IMS or SIP stack in the UE may register first with IMS with the intention of using IMS for VoIMS sessions and later the NAS may realize through the VoIMS Indicator that VoIMS is not available. In that case, it may be difficult for the IMS or SIP stack in the UE to indicate to the network that calls should not be delivered over IMS, and the core network infrastructure cannot distinguish between these two cases. As such, when the AS/NAS layer of a UE registered to the IMS knows through the VoIMS indicator that IMS voice calls are not possible and there is an incoming call being directed to the UE over IMS, the IMS stack in the UE might still accept the incoming voice call e.g. because the IMS stack is not tightly integrated with the AS/NAS stack and the IMS stack does not have the VoIMS indication. This problem may also arise when the UE performs an incorrect operation in accepting the incoming call over IMS.

A further problem may arise in cases where a UE has more than one voice solution running (i.e. different applications: examples are VoLGA and IMS). One voice solution may be provided by the operator (OpVoice), and one or more solutions may be provided by other parties via IMS (e.g. enterprise voice provided by enterprise), or AppVoice and AppIMS. In that case, to access OpVoice services, the UE may implement current solutions (e.g. those defined in 3GPP) for selection of IMS, CS fallback, and any other possible solutions (e.g. VoLGA). To access AppVoice, the UE may connect to the AppIMS infrastructure. The decision of whether to connect to AppIMS may not be based on the same rules/mechanisms used for OpVoice, because, if the UE decides to connect to AppIMS only when the VoIMS indicator from the transport layer is available and the network indicates that IMS is available, then the UE may not attempt IMS registration for other services. If the UE instead registers for AppVoice with AppIMS, routing problems on incoming AppVoice calls may need to be solved because the UE may not be in an area where the VoIMS indicator states that IMS voice calls are not supported (e.g. due to QoS).

In other words, problems may arise when the UE 1) is connected to the network and selects the voice solution for OpVoice as currently specified in 3GPP (i.e. based on the VoIMS indicator, the success or failure of CS fallback combined registration/TAU, etc.), or 2) the UE is connected to AppIMS for AppVoice based e.g. on policies provided to the UE by the AppVoice provider. Even if the VoIMS indicator is available and indicates no IMS voice is possible, or the VoIMS is not available, the UE may register for AppVoice with AppIMS if the policies indicate that the UE shall do so. The problem may also arise when the UE 3) is in an area where the VoIMS indicator states that IMS voice is not supported, or 4) when the AppVoice solution is not integrated with other voice solutions in the UE (e.g. VoLGA, CS fallback, etc.) and therefore the UE cannot "fallback" to other solutions to provide AppVoice to the UE when IMS voice is not available. The AppVoice stack may be separate from the OpVoice stack in the UE.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 8 is an illustration of an exemplary network component map showing components of a VoLGA network;

DETAILED DESCRIPTION

Figure 1:
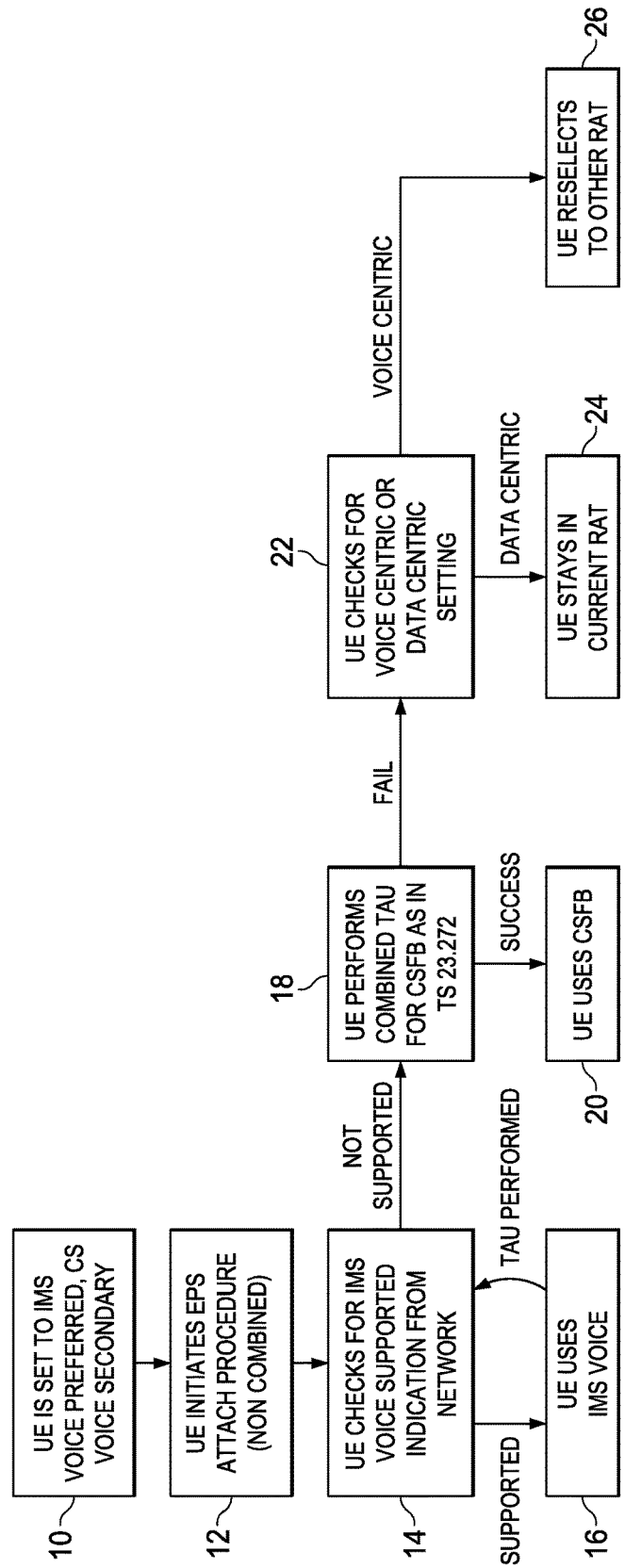
FIG. 1 is a flowchart of a UE behavior when performing non-combined EPS/IMSI attach where "prefer IMS PS Voice with CS Voice as secondary" is specified for the UE.

The present disclosure relates generally to a method for accessing voice services using a user equipment (UE) in a communication system and more specifically to a method for providing voice services in an Internet Protocol Multimedia Subsystem (IMS), and also to a corresponding network element.

The various aspects of the disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (for example, hard disk, floppy disk, magnetic strips, and the like), optical disks (for example, compact disk (CD), digital versatile disk (DVD), and the like), smart cards, and flash memory devices (for example, card, stick, and the like). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

The present invention provides a method for enabling services using a network component in a communication system supporting at least one of packet switched (PS) domain and circuit switched (CS) domain. The method comprises receiving a first SIP request; creating a second SIP request via the network component based upon the first SIP request; receiving a SIP response; and selecting a subsequent action upon receiving the SIP response. The method further comprises sending a third SIP request to the CS domain, making a decision to not select an alternative domain or using a CS protocol as a base transport to carry a SIP-like protocol as a result of selecting a subsequent action upon receiving the SIP response.

The present system further provides a method for accessing services using a user equipment (UE). The UE is configured to require a first service. The method includes the steps of establishing a session for communicating data between the UE and a network using a first network cell, and retrieving a listing of at least one of a second service supported by the first network cell. When the at least one of the second service supported by the first network cell is not equal to the at least one of a first service required by the UE, the method includes transmitting a message to the network indicating that the first service required by the UE is not supported.

The present invention further provides a system supporting at least one domain. The system comprises a UE configured to receive a first SIP request; and a network component configured to create a second SIP request based upon the first SIP request, subsequently receive a SIP response and select a subsequent action upon receiving the SIP response.

In various network deployments, the various network elements may include one or more SIP entities. A SIP entity may include a SIP Proxy or a SIP Server, for example. Some SIP entities are typically provided with a UA and may operate in two fashions: 1) as a User Agent Client (UAC) that generates request messages towards servers; and 2) as a User Agent Server (UAS) that receives request messages, processes them and generates suitable responses. In some application scenarios, a single UA may function as both a SIP entity (e.g., a UE device) or a network node.

In one implementation, SIP uses six types of requests: INVITE—Indicates that a user or service is invited to participate in a session (note: the term session and call session are sometime used interchangeably). ACK—Confirms that the client has received a final response to an INVITE request. BYE—Terminates a session and may be sent by either the caller or the callee. CANCEL—Cancels a previous request sent by UE. OPTIONS—Queries the capabilities of UEs. REGISTER—Registers the address listed in the To: header field with a SIP server. Because SIP is configured to evolve, a recipient may sometimes receive a method of request it does not recognize. Such a request may be designated as an UNKNOWN method of request.

In response to requests, SIP uses the following categories of responses: 1xx Informational Messages, 2xx Successful Responses, 3xx Redirection Responses, 4xx Request Failure Responses, 5xx Server Failure Responses, and 6xx General Failure Responses.

SIP messages are typically provided using a standardized message structure. The structure consists of a command line portion that identifies the initial line (request line in requests and status line in responses), a header portion that identifies one or more header fields that convey various pieces of information, and one or more message bodies that may be provided in the message body portion of a SIP message. A message body is operable to hold content such as plain text, coded images, or any information that may be rendered in a Markup Language such as eXtensible Markup Language (XML), Hyper-Text Markup Language (HTML), etc. Each message body (part) is described using header fields such as Content-Disposition, Content-Encoding, and Content-Type, that each provide information on the contents of the SIP message. In some implementations, the value of a Content-Type header field is a Multi-purpose Internet Mail Extension (MIME) type. IETF RFC 3261 provides further description of one implementation of a SIP, for example. In some system implementations, a SIP entity adheres to various 3GPP specifications such as 3GPP TS 23.228 and 3GPP TS 24.229.

One or more network nodes or network elements may comprise a core infrastructure or core network and be referred to as SIP entities. For example, network nodes may exemplify Proxy-Call Session Control Function (P-CSCF) nodes, Serving-CSCF or S-CSCF nodes, Interrogating-CSCF or I-CSCF nodes, Breakout Gateway Control Function (BGCF) nodes, Media Gateway Control Function (MGCF) nodes, Home Subscriber Server (HSS) nodes, IMS AS or Application Server nodes, and the like. As described above, the nodes as well as the endpoint UE devices may employ SIP as a communication protocol for session control, i.e., setting-up and tearing-down communication sessions. Accordingly, the network nodes and the UE devices may collectively be referred to as "SIP entities", or more generally, "communication protocol entities", that engage in sending and receiving suitable communication protocol messages (e.g., SIP messages) for effectuating various services, e.g., VCC, PTT, PoC, Emergency Services, ICS, etc.

IMS centralized services (ICS) allow services provided to an end user to be hosted within the IMS network. The services may be offered to subscribers that only have PS available for signaling or in cases where it may be more desirable to offer voice over a CS bearer. For ICS, the call and service control signaling may be performed via the SIP control channel over the Gm reference point as part of the PS domain while voice uses a traditional CS bearer (part of the CS domain), for example. To provide a full suite of services, the network and the UE may be capable of performing both voice and data transmissions at the same time (otherwise, the SIP control channel may be lost).

In some network deployments, ICS includes a SCC AS or SCC AS node. The SCC AS may be configured to provide Terminating Access Domain Selection (TADS) described per 3GPP TS 23.292 and 3GPP TS 23.237 for selecting the correct target for a mobile terminated call. The selection of the target may include a determination of the type of access the UE is using or requires. As such, a UE that is ICS and CS fallback capable may have registered via IMS and also registered via the MSC. The SCC AS can choose to use the target information associated with either of these registrations as targets to which the call may be delivered.

In some network deployments, ICS is not included and a Communication DIVersion (CDIV) AS or Telecommunication Application Server (TAS) is included. The CDIV AS may be configured to provide rule based communication diversion as described per 3GPP TS 24.604 for selecting the correct target for a mobile terminated call. The selection of the target may include a determination of the type of access the UE is using or requires. As such, a UE that is CDIV capable may have registered via IMS and also registered in the MSC. The CDIV AS can target the communication or components of the communication (e.g. only the voice component) to the UE using either of these targets. A CDIV AS may not be able to target only components of the communication, in which case one or more other node(s) in the communication network takes care of transmitting only media suited for transport over CS (e.g. voice, messaging) over the CS domain. The CDIV AS is rule based and the rules can be configured. The rules are expressed in Common Policy XML, e.g. per IETF RFC 4745 or OMA XDM or 3GPP TS 24.623. The rules can be managed using the Ut interface and the XCAP protocol. When configuring the CDIV AS with rules that identify the target in certain conditions are met, a communication can be redirected as specified in 3GPP TS 24.604. 1) In order to redirect a communication to e.g. an address served by the CS domain if the last known access network the UE has used for communications matches an access network indicated in a rule, such a rule would have to be provisioned. 2) In order to redirect a communication to e.g. an address served by the CS domain if the network (e.g. nodes in the communication network supporting PCC) indicates the UE is attached to an access network that matches an access network indicated in a rule, such a rule would have to be provisioned. 3) In order to redirect a communication to e.g. an address served by the CS domain if the (last known or PCC-determined) access network indicates the UE is attached to an access network which is unable to support IMS voice and a rule indicates that in such a case the communication needs to be redirected to an address served by an access network that does support the voice media (e.g. CS domain), such a rule would have to be provisioned. 4) In order to redirect a communication to e.g. an address served by the CS domain if the UE indicates it is unable to receive IMS or PS voice over the present access network (e.g. by indicating CS voice media in the SDP (see ietd draft-ietf-mmusic-sdp-cs) or a SIP message, e.g. a SIP message in response to an INVITE request) and a rule indicates that in such a case the communication needs to be redirected to an address served by an access network capable of IMS voice or capable of CS voice media (as indicated in the SDP (e.g. CS domain)), such a rule would have to be provisioned. The condition portions of the rules exemplified above can be combined in various ways, along with other conditions (e.g. other conditions as specified in 3GPP TS 24.604). A further advantage of this approach is that a CDIV AS can be provisioned with a preference, e.g. the preference where the voice media is delivered.

In situations where the network does not support the ability to have both CS and Gm interfaces active at the same time, I1 may be used. I1 is an interface or reference point between UE and the network, and may be used in cases where some restrictions (e.g. an absence of a Gm reference point or lack of support for Dual Transfer Mode (DTM) prevent use of the SIP control channel with CS bearer concurrently.

In some networks, a PCC functionality has been introduced for various networks including Evolved Packet Core (EPC) and GPRS networks (including, for example, GERAN/UTRAN). PCC functionality may include a Policy and Charging Enforcement Function (PCEF), a Bearer Binding and Event Reporting Function (BBERF), a Policy and Charging Rules Function (PCRF), an Application Function (AF), an Online Charging System (OCS), an Offline Charging System (OFCS) and a Subscription Profile Repository (SPR). The PCC architecture may extend the architecture of an IP CAN (e.g. the GPRS core network or the EPC), where the Policy and Charging Enforcement Function is a functional entity in the Gateway node implementing the IP access to the PDN.

FIGS. 1 to 5 are illustrations of various use case scenarios that show the required UE actions for different combinations of a network's VoIMS indicator and the UE's usage settings.

FIG. 1 is a flowchart of a UE behavior when performing non-combined EPS/IMSI attach where "prefer IMS PS Voice with CS Voice as secondary" is specified for the UE. In step 10 the UE is set to IMS voice preferred, with CS voice secondary. In step 12 the UE initiates an EPS attached procedure (as shown, the attach procedure is non-combined) and in step 14 the UE checks for an IMS voice support indication from the network. If supported, the UE uses IMS voice in step 16 and may return to step 14 after performing a Tracking Area Update (TAU). If, however, IMS voice is not supported, the UE performs a combined TAU for CS fallback in step 18. If successful, the UE uses the voice services made available as a result of the CS fallback in step 20. If, however, CS fallback fails, the UE checks its own settings to determine whether it is voice centric or data centric in step 22. If data centric, the UE stays in the current RAT in step 24. If, however, the UE is voice centric, it reselects to an alternative RAT in step 26.

Figure 2:
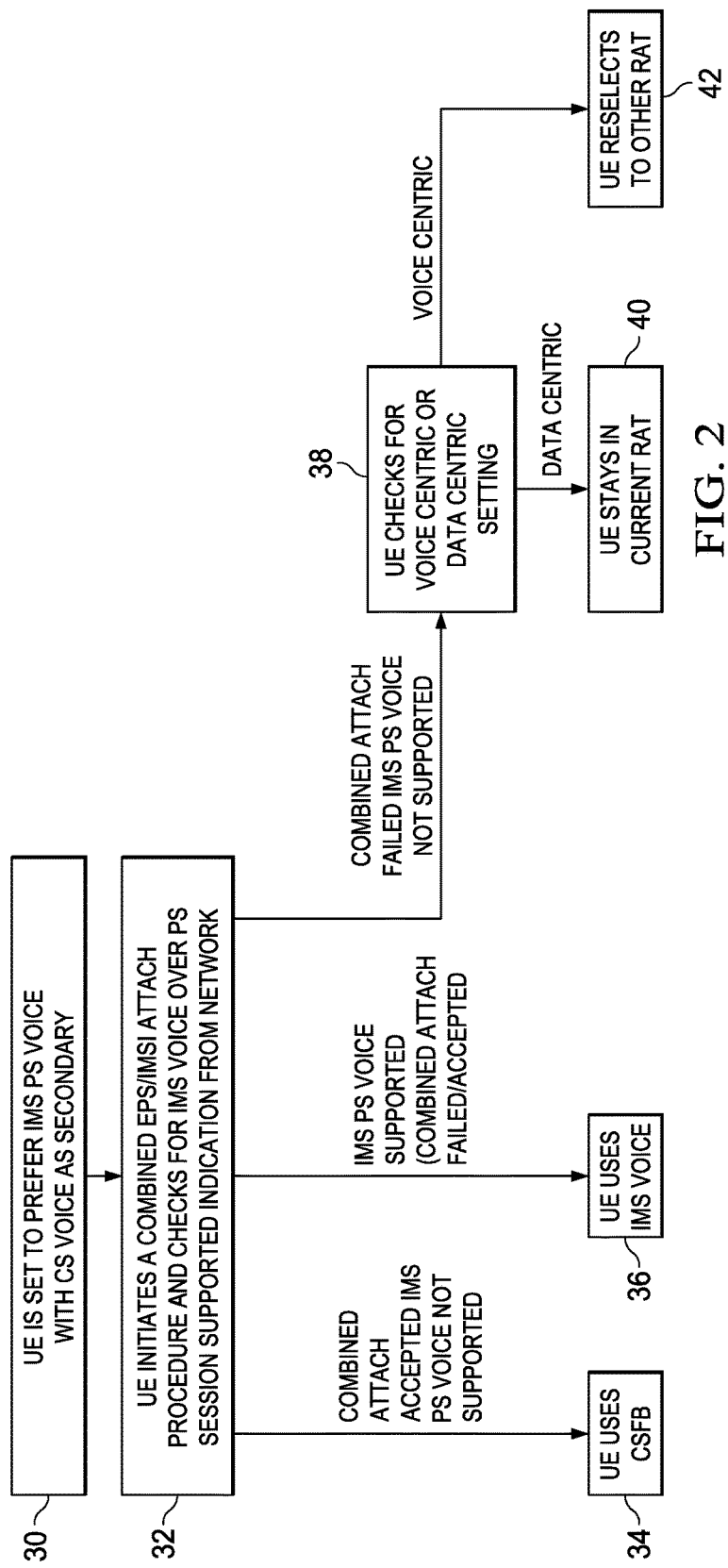
FIG. 2 is a flowchart of UE behavior when performing combined EPS/IMSI attach, with a setting of "IMS PS Voice Preferred, CS Voice Secondary" specified for the UE.

FIG. 2 is a flowchart of UE behavior when performing combined EPS/IMSI attach, with a setting of "IMS PS Voice Preferred, CS Voice Secondary" specified for the UE. In step 30, the UE is set to prefer IMS PS Voice with CS Voice as secondary. In step 32, the UE initiates a combined EPS/IMSI attach procedure and checks for IMS Voice over PS session supported Indication from the Network. In step 34, if the combined attach is accepted and IMS PS Voice is not supported, the UE uses CF fallback to establish a voice connection. If, however, IMS PS Voice is supported (whether or not the combined attach failed or was accepted), the UE uses the IMS Voice service in step 36. If the combined attach failed and IMS PS Voice is not supported, the UE checks its settings for a preference for voice centric or data centric communications in step 38. If data centric, the UE stays in the current RAT in step 40. If, however, voice centric, the UE reselects to another RAT to access voice services in step 42.

Figure 3:
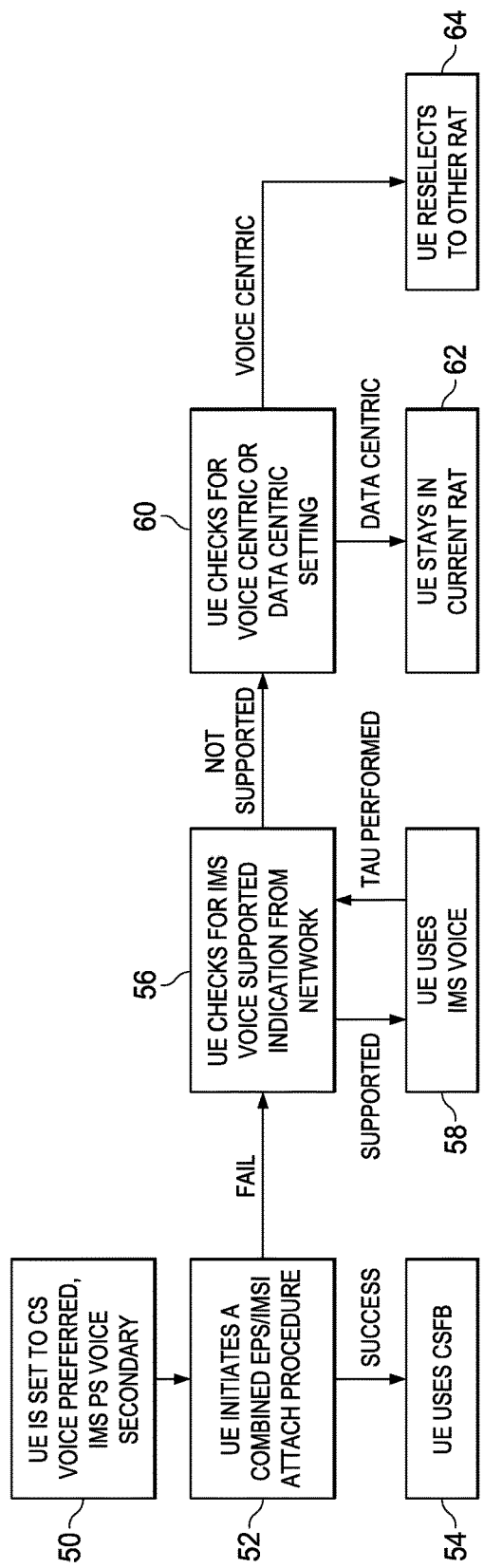
FIG. 3 is a flowchart of UE behavior with the setting of: "CS Voice Preferred, IMS PS Voice Secondary" specified for the UE.

FIG. 3 is a flowchart of UE behavior with the setting of "CS Voice Preferred, IMS PS Voice Secondary" specified for the UE. In step 50, the UE is set to CS Voice preferred, IMS PS Voice secondary. In step 52, the UE initiates a combined EPS/IMSI attach procedure. If successful, the UE uses CS fallback in step 54. If unsuccessful, the UE checks for an IMS Voice Supported Indication from the network in step 56. If supported, the UE uses IMS voice services in step 58 and performs a TAU. If not supported, the UE checks its settings to determine whether it is voice or data centric in step 60. If data centric, the UE stays in the current RAT in step 62. If voice centric, the UE reselects to another RAT in step 64.

Figure 4:
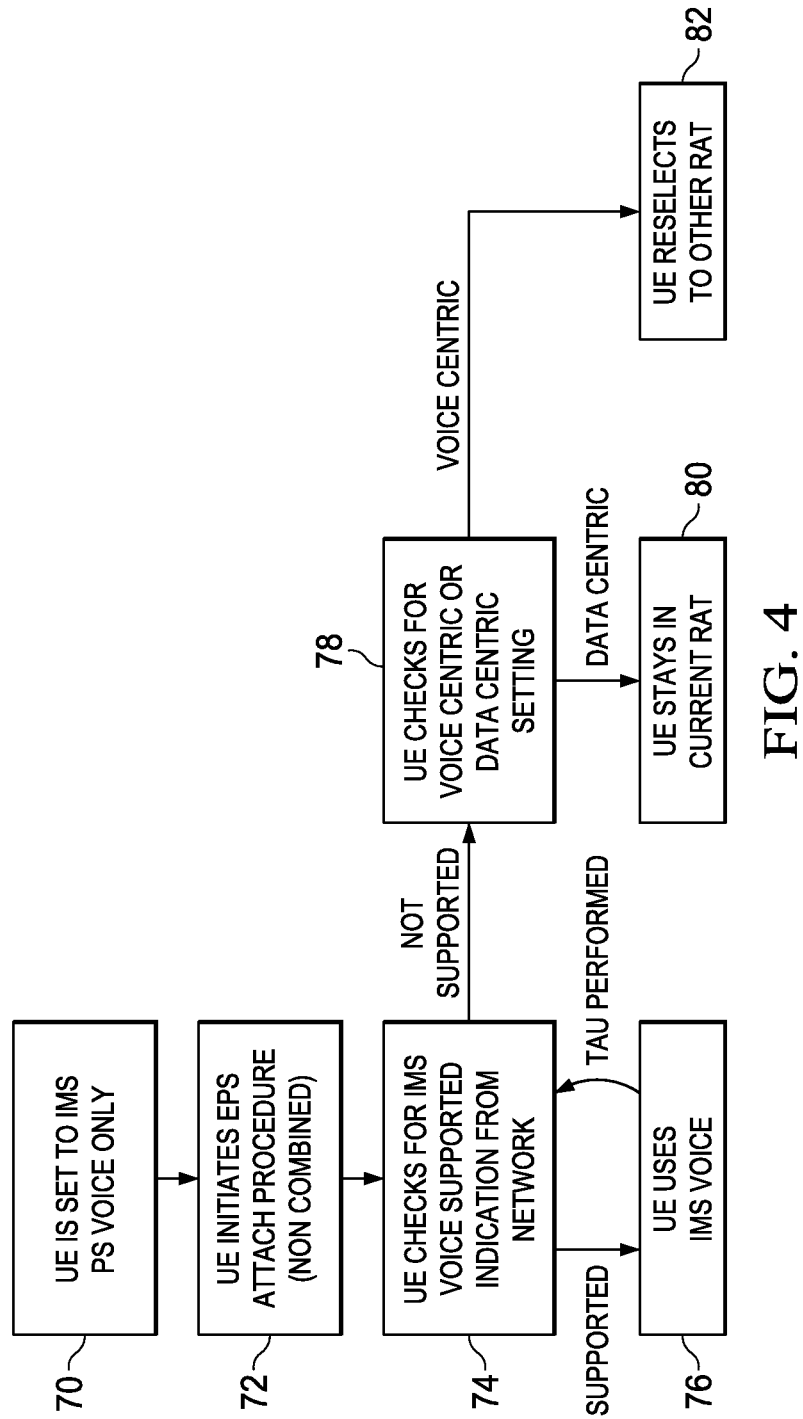
FIG. 4 is a flowchart of UE behavior with the setting of "IMS PS Voice only" specified for the UE.

FIG. 4 is a flowchart of UE behavior with the setting of "IMS PS Voice only" specified for the UE. In step 70 the UE is set to IMS PS voice only. In step 72 the UE initiates the EPS attach procedure and in step 74 the UE checks for an IMS voice support indication from the network. If supported, the UE uses IMS voice in step 76 and may return to step 74 after performing a Tracking Area Update (TAU). If, however, IMS voice is not supported, the UE checks its own settings to determine whether it is voice centric or data centric in step 78. If data centric, the UE stays in the current RAT in step 80. If, however, the UE is voice centric, it reselects to an alternative RAT in step 82.

Figure 5:
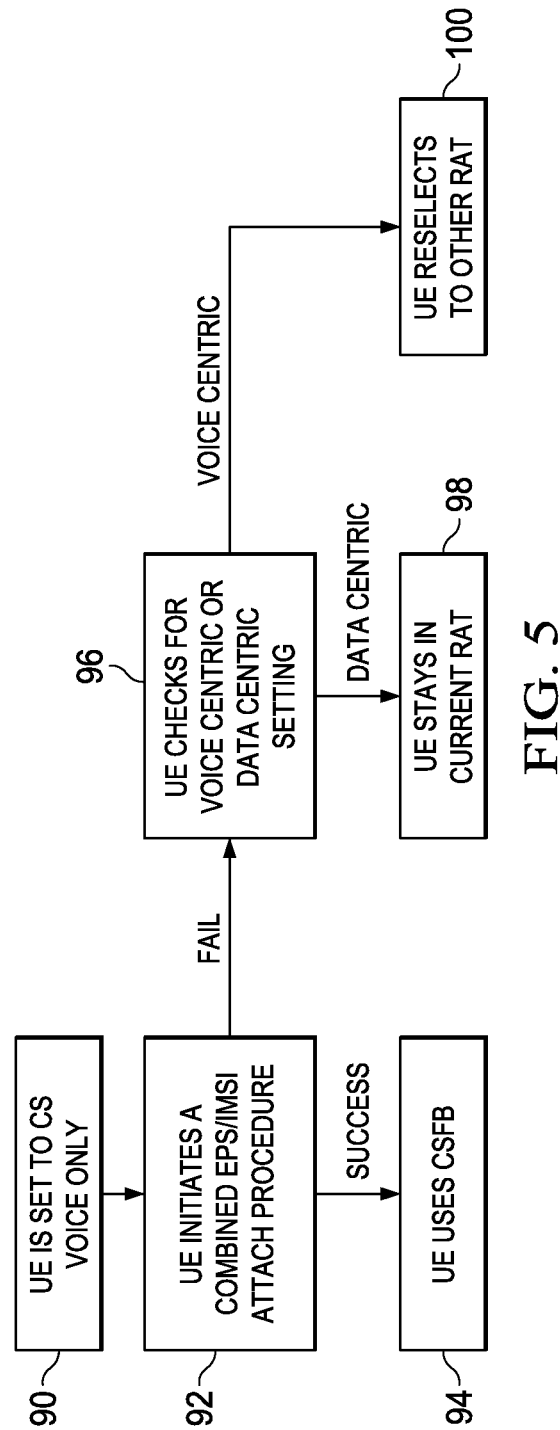
FIG. 5 is a flowchart of UE behavior with the setting of "CS Voice only" specified for the UE.

FIG. 5 is a flowchart of UE behavior with the setting of "CS Voice only" specified for the UE. In step 90, the UE is set to CS Voice only. In step 92, the UE initiates a combined EPS/IMSI attach procedure. If successful, the UE uses CS fallback in step 94. If unsuccessful, the UE checks its settings to determine whether it is voice or data centric in step 96. If data centric, the UE stays in the current RAT in step 98. If voice centric, the UE reselects to another RAT in step 100.

Figure 6:
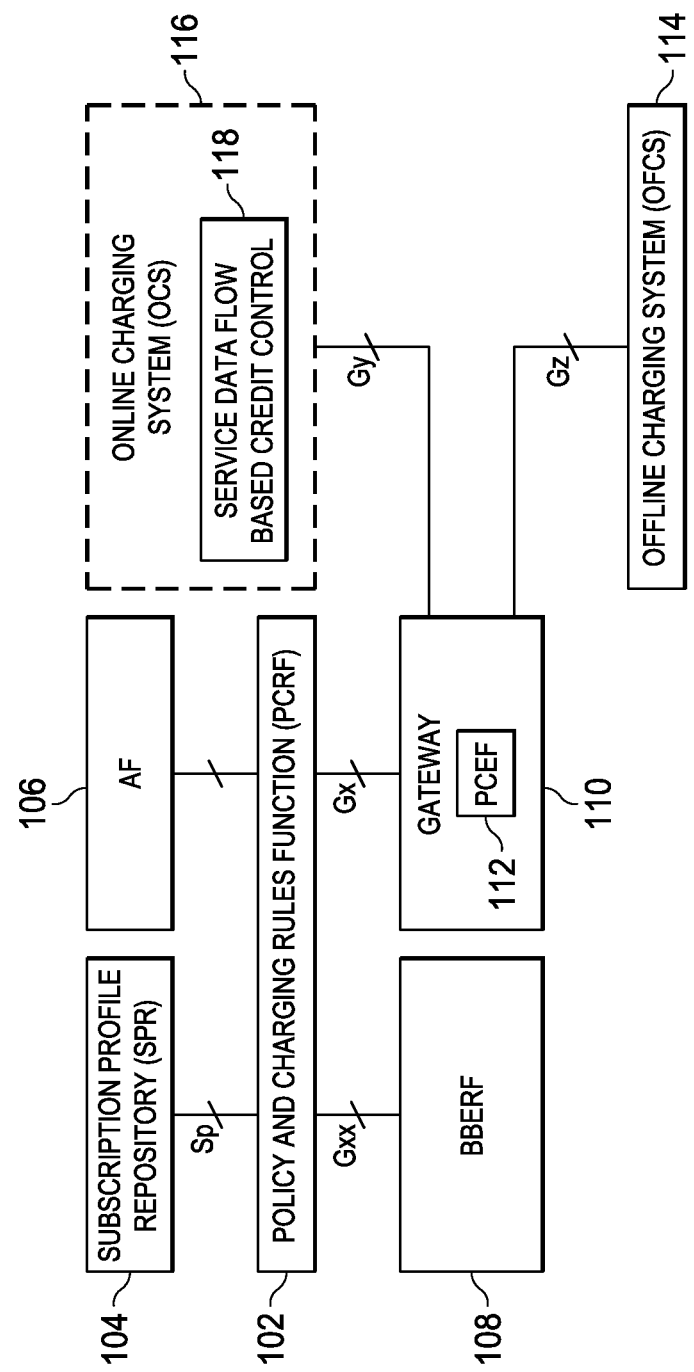
FIG. 6 is an illustration showing an overall Policy Control and Charging Control (PCC) logical architecture in a non-roaming configuration.

FIG. 6 is an illustration showing an overall PCC logical architecture in a non-roaming configuration. PCRF 102 is in communication with SPR 104, AF 106, BBERF 108 and Gateway 110 (including PCEF 112). Gateway 110 is in communication with both OCS 116 and OFCS 114. OCS 116 provides a Service Data Flow Based Credit Control 118. In the exemplary PCC architecture, AF 106 provides services to the UEs (e.g. AF 106 may be an IMS server).

Figure 7B:
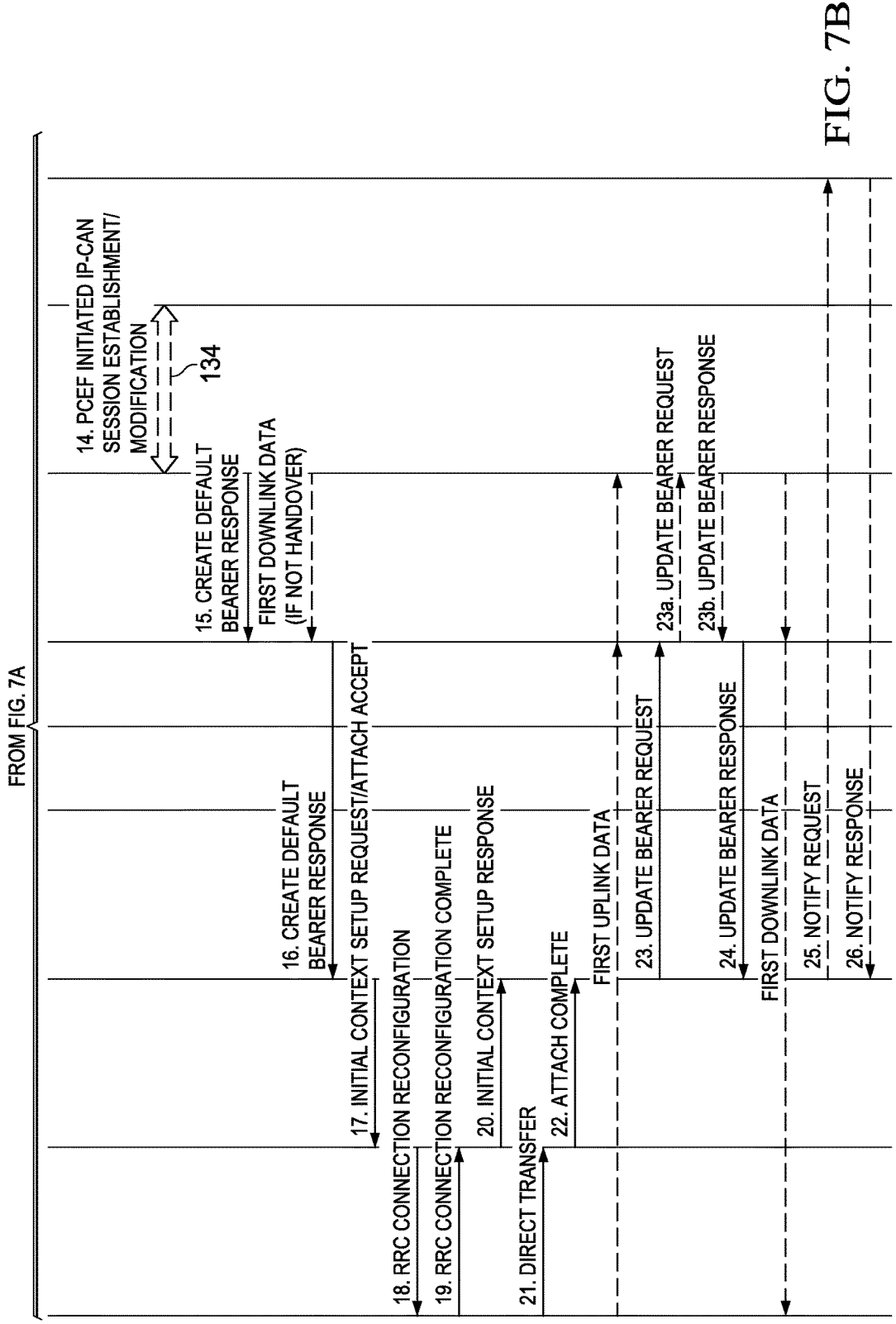
FIG. 7 illustrates an example message flow for performing an attach procedure involving interaction with a PCC.

Upon attachment to an EPC through LTE, there may be an interaction with the PCC as illustrated in FIG. 7. FIG. 7 illustrates an example message flow for performing an attach procedure involving interaction with a PCC. In particular, the steps indicated by elements 130, 132, and 134 all involve an interaction with the PCRF in the PCC architecture. The PCC may interact with the core network during attachment to GERAN/UTRAN and the core network may interact with the PCC for policing the bearers upon LTE TAU, and the PCC may interact with the GPRS core network upon routing area update.

When an application in the network requires specific bearers with QoS to provide a service (e.g., IMS requiring a bearer capable of carrying voice in order to provide VoIMS), the IMS interacts with the PCC to request such a bearer. In turn, the PCC interacts with the EPC (for LTE) or the GPRS core network (for GERAN/UTRAN) to establish the appropriate bearers.

In Voice over LTE via Generic Access (VoLGA), an operator may reuse the existing CS domain entities (e.g., MSC/VLR) that control establishment of CS services under E-UTRAN coverage to provide IMS. The VoLGA Access Network Controller (VANC) enables the UE to access the MSC/VLR using generic IP connectivity provided by the EPS. The VANC can be connected to the MSC/VLR using the A-interface ("VoLGA A-mode") or the Iu-CS interface ("VoLGA Iu-mode"). From the EPS point of view, the VANC is viewed as an Application Function.

FIG. 8 is an illustration of an exemplary network component map showing components of a VoLGA network. In VoLGA A-mode architecture, the VANC in the Home Public Land Mobile Network (HPLMN) is connected to the MSC/VLR using the A-interface ("VoLGA A-mode") as shown by connection 140 on FIG. 8. In the VoLGA Iu-mode architecture, however, the VANC in the HPLMN may be connected to the MSC/VLR using the Iu-CS interface ("VoLGA Iu-mode") replacing the A-interface 140 of FIG. 8.

Figure 9:
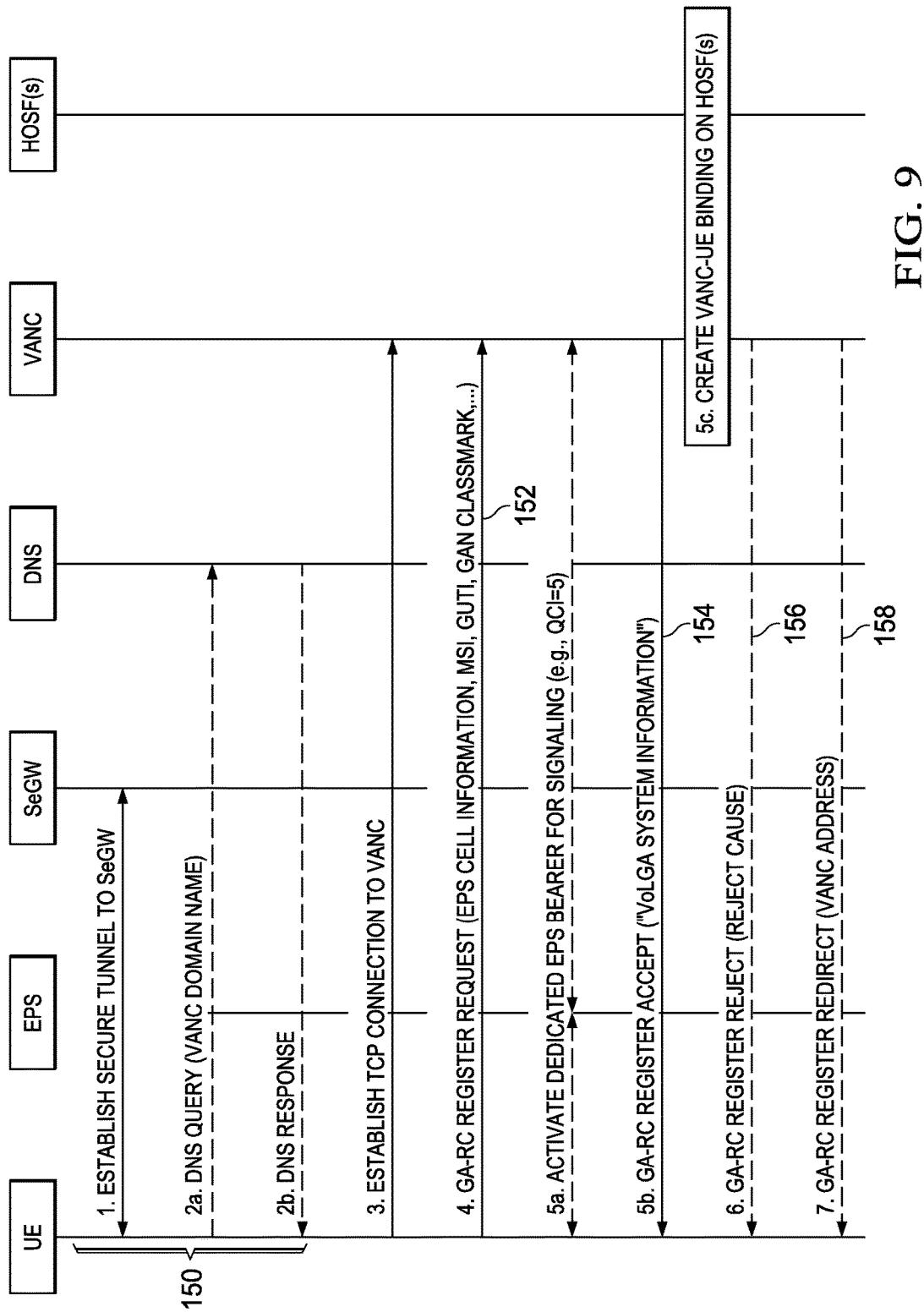
FIG. 9 illustrates a message flow for a UE to register with a VoLGA network.

FIG. 9 illustrates a message flow for a UE to register with a VoLGA network. To obtain connectivity, the UE first discovers a VANC in the steps indicated by element 150. If the UE has successfully completed the VANC discovery procedure (i.e., has the address of a SeGW and a VANC), the UE may attempt VoLGA registration in the step indicated by element 152. The VANC may accept the registration in the step indicated by element 154, reject the registration in the step indicated by element 156, or redirect the UE to another VANC (e.g., depending on the UE's location, load balancing or roaming conditions), as illustrated by the step indicated by element 158.

Figure 10:
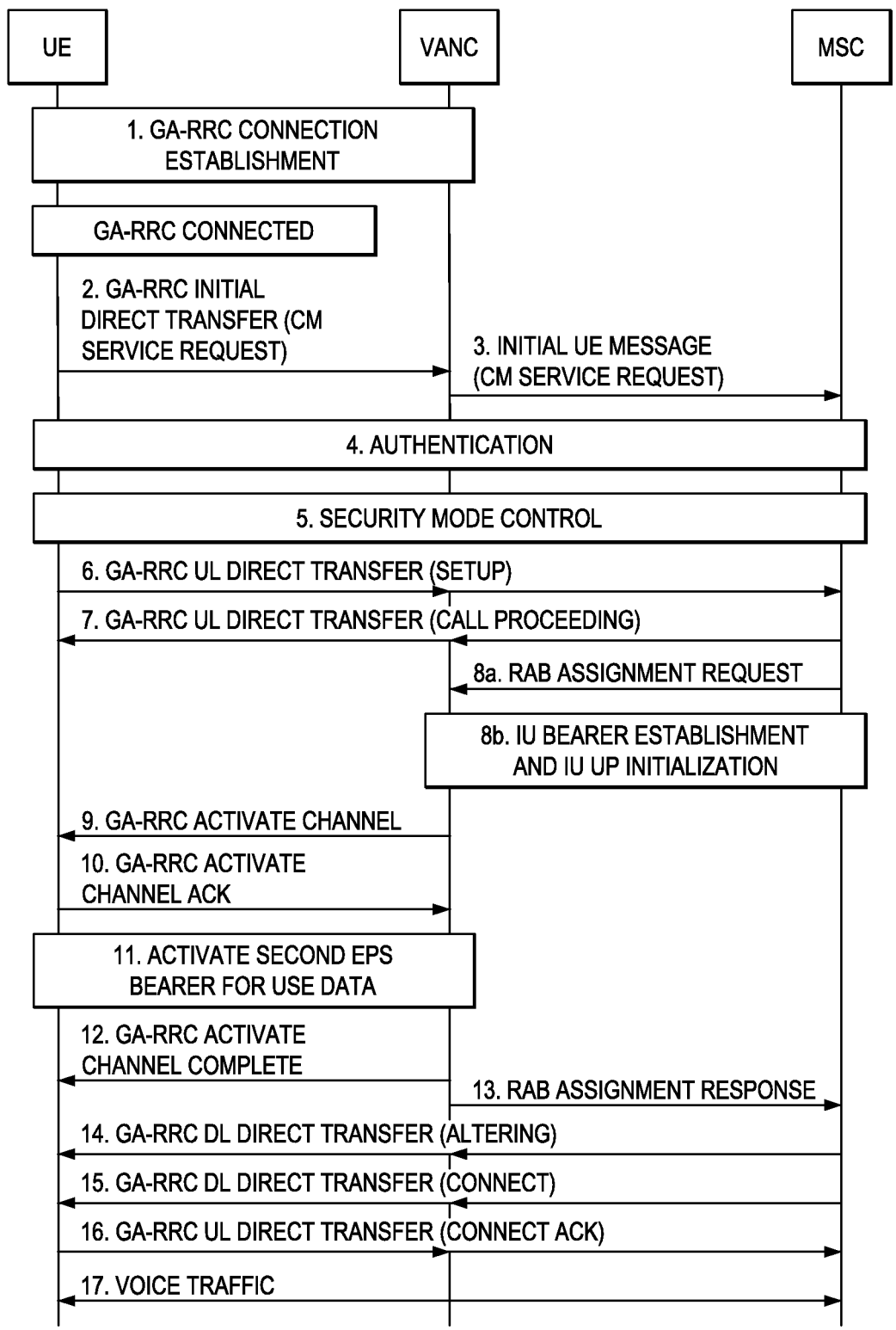
FIG. 10 illustrates a message flow for establishing a connection between a UE and a VoLGA network for initiating a VoLGA Mobile-originated call.
Figure 11:
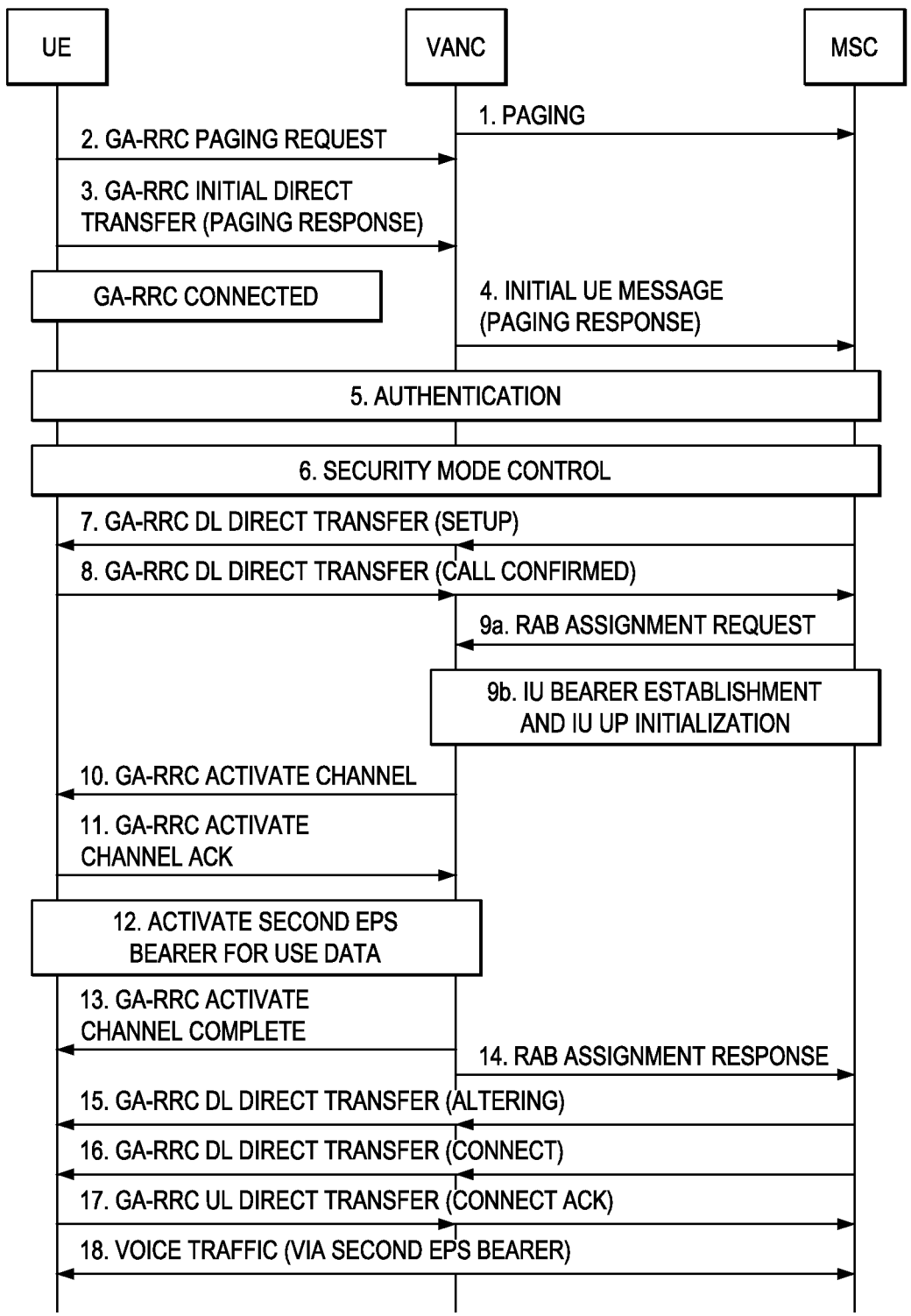
FIG. 11 illustrates a message flow for establishing a connection between a UE and a VoLGA network for a Mobile-terminated call.

A UE performing a VoLGA Mobile-originated call may follow the steps illustrated in FIG. 10. FIG. 10 illustrates a message flow for establishing a connection between a UE and a VoLGA network for initiating a VoLGA Mobile-originated call. The UE establishes the signaling for a Mobile-Originated call with the CS domain (via the MSC) and then a bearer over LTE and the VoLGA tunnel is established. Alternatively, FIG. 11 illustrates a message flow for establishing a connection between a UE and a VoLGA network for a Mobile-terminated call.

In general, a UE may require access to a service, feature or group of services and/or features. The UE may be configured to access multiple RATs and decide whether to obtain connectivity, service, or features from one or more of the RATs. In the present disclosure, connectivity may not mean the UE can obtain access to every one of the services or features. Instead, connectivity may mean that the UE is authenticated and authorized to access that RAT. As part of this process, the UE may discover that the desired service or feature is not available on the RAT. The desired services or features may include obtaining information, soliciting information, and requesting various point-to-point messages including Dynamic Host Configuration Protocol (DHCP) requests, Remote Authentication Dial In User Service (RADIUS) requests, Diameter requests, Attach accept, requests, etc. from the network. The desired services or features may also include being provided by the network certain point-to-point messages including DHCP responses, RADIUS responses, Diameter responses, Attach accept, OK indications, detecting information such as in broadcast messages, and scanning for information.

The UE makes a determination of how it will obtain the desired services or features. Although the determination may be performed at the AS/NAS level, once the NAS/AS selection is made, the UE may need to inform the infrastructure providing the services (e.g. the IMS) how it will obtain the desired services. For example, in the case that the selection based on the AS/NAS results in the UE camping on an LTE network cell with no voice services, the UE may inform IMS after a successful registration for non-voice services that voice calls cannot be routed through the IMS.

In some cases, the UE may inform the network that the services or features that it requires are not available and that an alternative RAT should be used to deliver those services or features. The UE may send a message to the network to indicate that either a specific RAT should be used for a service or feature, or that the identified RAT does not support the service or features required. When the UE receives from the network a request to deliver the service or feature, the UE may do the following: If the network proposes an alternative RAT to support a service or feature, the UE may indicate back to the network a desire to use the alternative RAT for part of or all of the service or feature being offered;

or the UE may send an appropriate error cause back to the network that will trigger the network to attempt delivery of the service or feature over the alternative RAT.

Alternatively, upon discovering that a feature or service is not available based on the VoIMS Indicator or SR-VCC indicator, the UE may signal to the network that an alternative RAT should be used for certain services or features. In the present example, the network may be configured to support CS fallback, and the UE may not include the ICS feature tag when it registers with an IMS network (e.g. because it does not implement SDP CS functionality (as defined in ietf draft-ietf-mmusic-sdp-cs)). As such, it may be the network that is required to determine how to route the call based on whether the UE has access to IMS.

Figure 12:
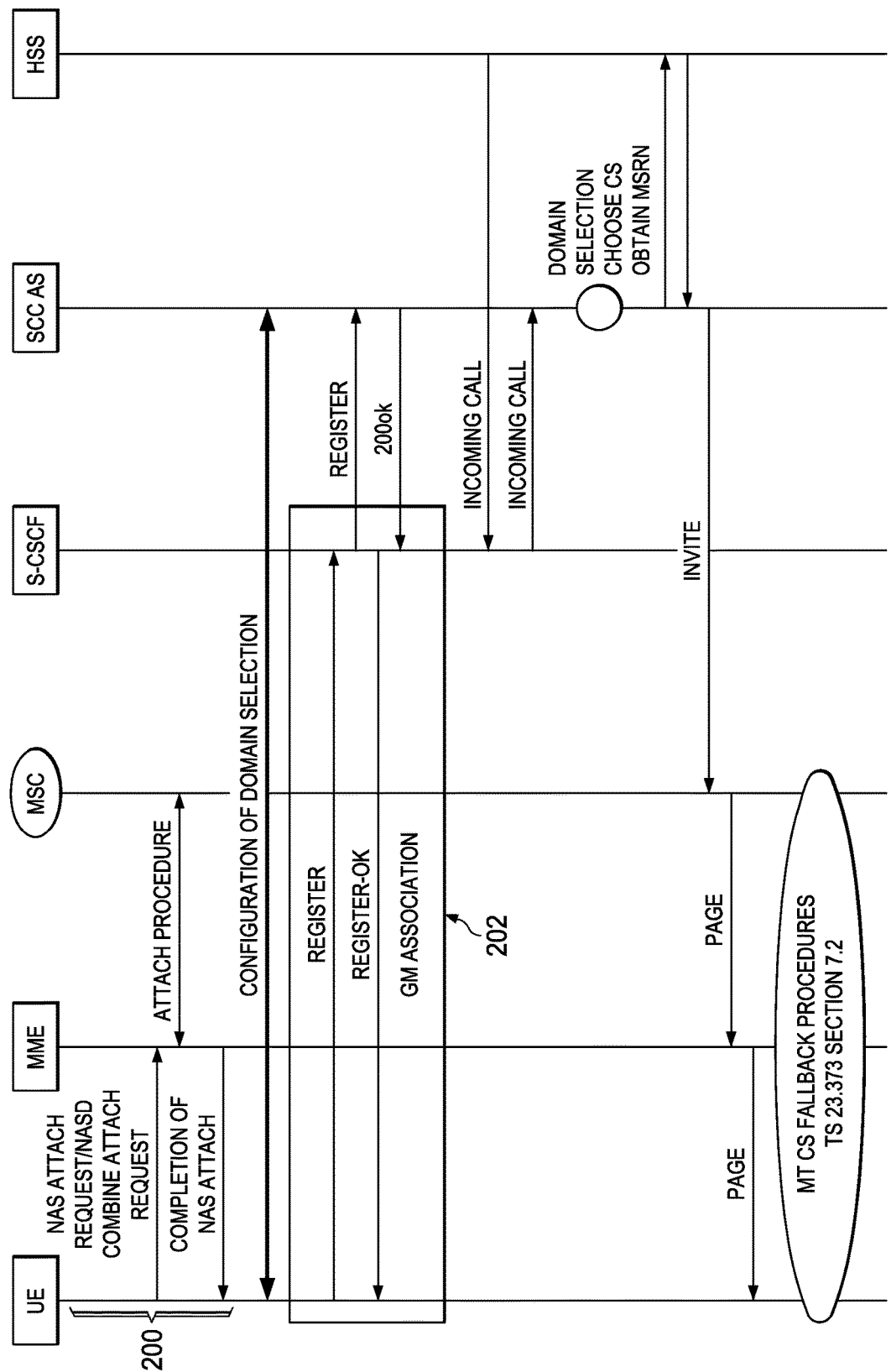
FIG. 12 is an illustration of a message sequence for notifying a network of a capability of the UE.

FIG. 12 is an illustration of a message sequence for notifying a network of a capability of the UE. In steps 200 of FIG. 12, the UE performs an NAS Attach procedure or NAS Combined Attach procedure and attaches to the EPC at the MME, or performs a NAS TAU (Tracking Area Update) procedure or NAS Combined TAU when moving to LTE from another access or when moving to a different tracking area. As shown in FIG. 12, the MME may signal back per existing standards at least one flag that indicates whether IMS is supported or if SRVCC is supported. In the case of a combined attach or TAU, the MME interacts with the MSC to register the UE with the MSC in steps 202. Upon receipt of this information, in step 204, the UE may then inform a network node (e.g. IMS AS or SCC AS) of the UE's preferences to determine how terminating sessions should be delivered based on the UE's knowledge of the lack of support of the desired service or feature. For example, the UE may transmit its preferences to an IMS AS or SCC AS if the Voice Over IMS (VoIMS) flag is found to have a negative indication or is not received from the MME, or SRVCC is not supported and the UE requires SRVCC to operate. Another example is that the UE may always signal its desired preferences regarding how a terminating session should be delivered based on the knowledge of the lack of support of the desired service or feature (e.g. the settings of the VoIMS and SRVCC flag, indicator, or identifier).

The UE's preferences may be to send all services to domain A (e.g. CS domain, independently of the specific RAT—i.e. GERAN or UTRAN) or a second domain B. Alternatively, the preferences may provide a structured indication specifying that certain service requests are to be sent over certain domains. In some cases, the preferences may be specified in parallel with registration steps 202 as shown on FIG. 12, or after. For example, based on the settings of the VoIMS and SRVCC flag, indicator, or identifier, the UE may decide that specific services are sent over LTE e.g. SMSoverIP, Video, etc. and that voice should be sent over GERAN/UTRAN.

Several interfaces or reference points may be used to implement one or more of the steps illustrated in FIG. 12. One such interface or reference point is the Ut interface (generally, between the UE and a SIP Application Server, the XCAP and SIP Subscribe/Notify protocol may be used as part of the Ut interface). Another potential interface or reference point may include I1, if I1 were to be enhanced to interact with, for example, XCAP and/or SIP Subscribe/Notify. I1 is a reference point between the UE and the IMS AS and uses Short Message Service (SMS) or Unstructured Supplementary Service (USSD) as a base transport to carry a SIP-like protocol.

Alternatively, the UE may use a different form of signaling to notify the network of one or more of the capabilities of the UE. In one network configuration, the IMS AS is in the path of the SIP messages that were directed to the UE and sent from the UE, and for which the IMS AS included its URI in the Record-Route header field. The S-CSCF may direct a SIP message to IMS AS as instructed in the applicable initial Filter Criteria (iFC). As such, the UE may include in various SIP messages, information about a lower layer's status (e.g. whether IMS Voice is supported or not, as shown below by the Media Feature Tag Definition and P-Access-Network-Info header field). This may act as an indicator or flag that may be explicit as illustrated in the following SIP Method examples. The indicator may be defined by a) a P-Access-Network-Info header field in the SIP messages as shown by the following P-Access-Network-Info header field or b) a feature tag as described herein.

Media Feature Tag Definition

The following is an illustration of exemplary media feature tag definitions.

A.1 Definition of Media Feature Tag g.3gpp.novoice

Media feature-tag name: g.3gpp.novoice

ASN.1 Identifier: 1.3.6.1.8.2.x

Summary of the media feature indicated by this tag: This feature-tag indicates that the device cannot support full duplex voice.

Values appropriate for use with this feature-tag: Boolean.

The feature-tag is intended primarily for use in the following applications, protocols, services, or negotiation mechanisms: This feature-tag is most useful in a communications application, for describing the capabilities of a device, such as a phone or PDA.

Examples of typical use: Indicating that a mobile phone does not support full duplex voice. Other forms of speech maybe supported such as streaming radio etc.

A.2 Definition of Media Feature Tag g.3gpp.CSFB

Media feature-tag name: g.3gpp.CSFB

ASN.1 Identifier: 1.3.6.1.8.2.y

Summary of the media feature indicated by this tag: This feature-tag indicates that the device has performed successful combined attached (CSFB registration).

Values appropriate for use with this feature-tag: Boolean.

The feature-tag is intended primarily for use in the following applications, protocols, services, or negotiation mechanisms: This feature-tag is most useful in a communications application, for describing the capabilities of a device, such as a phone or PDA.

Examples of typical use: Indicating that a mobile phone has performed a successful combined attached over SGs interface.

P-Access-Network-Info header field (changed are shown in underlined text)

7.2A.4 P-Access-Network-Info Header Field 7.2A.4.1 Introduction

The P-Access-Network-Info header field is extended to include specific information relating to particular access technologies.

7.2A.4.2 Syntax

The syntax of the P-Access-Network-Info header field is described in RFC 3455. There are additional coding rules for this header field depending on the type of IP-CAN, according to access technology specific descriptions.

The following Table 2 describes the 3GPP-specific extended syntax of the P-Access-Network-Info header field defined in RFC 3455.

TABLE 2

P-Access-Network-Info = "P-Access-Network-Info" HCOLON
access-net-spec *(COMMA access-net-spec)
   access-net-spec    = (access-type / access-class) *(SEMI access-info)
   access-type    = "IEEE-802.11" / "IEEE-802.11a" / "IEEE-802.11b" / "IEEE-802.11g" / "IEEE-802.11n" / "3GPP-GERAN" / "3GPP-UTRAN-FDD" / "3GPP-UTRAN-TDD" / "3GPP-E-UTRAN-FDD" / "3GPP-E-UTRAN-TDD" / "ADSL" / "ADSL2" / "ADSL2+" / "RADSL" / "SDSL" / "HDSL" / "HDSL2" / "G.SHDSL" / "VDSL" / "IDSL" / "3GPP2-1X" / "3GPP2-1X-HRPD" / "3GPP2-UMB" / "DOCSIS" / "IEEE-802.3"/ "IEEE-802.3a" / "IEEE-802.3e" / "IEEE-802.3i"/ "IEEE-802.3j" / "IEEE-802.3u" / "IEEE-802.3ab"/ "IEEE-802.3ae"/"IEEE-802.3ak"/IEEE-802.3aq"/ "IEEE-802.3an" / "IEEE-802.3y"/ "IEEE-802.3z"/ "IEEE-802.3y"/ token
   ...access-class    = "3GPP-GERAN" / "3GPP-UTRAN" / "3GPP-E-UTRAN" / "3GPP-WLAN" / "3GPP-GAN" / "3GPP-HSPA" / token
   np    = "network-provided"
access-info    = cgi-3gpp / utran-cell-id-3gpp / dsl-location / i-wlan-node-id / ci-3gpp2 / eth-location / np/ e-utran-voice-3gpp / extension-access-info
extension-access-info = gen-value
cgi-3gpp    = "cgi-3gpp" EQUAL (token / quoted-string)
utran-cell-id-3gpp    = "utran-cell-id-3gpp" EQUAL (token / quoted-string)
i-wlan-node-id    = "i-wlan-node-id" EQUAL (token / quoted-string)
dsl-location    = "dsl-location" EQUAL (token / quoted-string)
eth-location    = "eth-location" EQUAL (token / quoted-string)
ci-3gpp2    = "ci-3gpp2" EQUAL (token / quoted-string)
e-utran-voice-3gpp    = " NW-provided-VoIMS-indicator "

The presence of the "np" parameter indicates a P-Access-Network-Info header field is provided by the P-CSCF. The content can differ from a P-Access-Network-Info header field without this parameter which is provided by the UE.

The "np" parameter can be used with both "access-type" and "access-class" constructs. The "access-type" construct is provided for use where the value is not known to be specific to a particular "access-class" value, e.g. in the case of some values delivered from the PCRF.

7.2A.4.3 Additional Coding Rules for P-Access-Network-Info Header Field

The P-Access-Network-Info header field is populated with the following contents:

1) the access-type field set to one of "3GPP-GERAN", "3GPP-UTRAN-FDD", "3GPP-UTRAN-TDD", "3GPP2-1X", "3GPP2-1X-HRPD", "3GPP2-UMB", "IEEE-802.11", "IEEE-802.11a", "IEEE-802.11b", "IEEE-802.11g", "IEEE-802.11n", "ADSL", "ADSL2", "ADSL2+", "RADSL", "SDSL", "HDSL", "HDSL2", "G.SHDSL", "VDSL", "IDSL", or "DOCSIS", "IEEE-802.3", "IEEE-802.3a", "IEEE-802.3e", "IEEE-802.3i", "IEEE-802.3j", "IEEE-802.3u", or "IEEE-802.3ab", "IEEE-802.3ae", IEEE-802.3ak", IEEE-802.3aq", IEEE-802.3an", "IEEE-802.3y", "IEEE-802.3z" or "IEEE-802.3y" as appropriate to the access technology in use.

2) if the access type field is set to "3GPP-GERAN", a cgi-3gpp parameter set to the Cell Global Identity obtained from lower layers of the UE. The Cell Global Identity is a concatenation of MCC, MNC, LAC and CI (as described in 3GPP TS 23.003). The value of "cgi-3gpp" parameter is therefore coded as a text string as follows:

Starting with the most significant bit, MCC (3 digits), MNC (2 or 3 digits depending on MCC value), LAC (fixed length code of 16 bits using full hexadecimal representation) and CI (fixed length code of 16 bits using a full hexadecimal representation);

3) if the access type field is equal to "3GPP-UTRAN-FDD", or "3GPP-UTRAN-TDD", a "utran-cell-id-3gpp" parameter set to a concatenation of the MCC, MNC, LAC (as described in 3GPP TS 23.003) and the UMTS Cell Identity (as described in 3GPP TS 25.331), obtained from lower layers of the UE, and is coded as a text string as follows:

Starting with the most significant bit, MCC (3 digits), MNC (2 or 3 digits depending on MCC value), LAC (fixed length code of 16 bits using full hexadecimal representation) and UMTS Cell Identity (fixed length code of 28 bits using a full hexadecimal representation);

4) if the access-class field is set, the "np" access-info parameter is the only access-info parameter inserted. This release of this specification does not define values for use in this parameter. The access-class field can be set only by the P-CSCF;

5) if the access type field is set to "3GPP2-1X", a ci-3gpp2 parameter set to the ASCII representation of the hexadecimal value of the string obtained by the concatenation of SID (16 bits), NID (16 bits), PZID (8 bits) and BASE_ID (16 bits) (see 3GPP2 C.S0005-D [85]) in the specified order. The length of the ci-3gpp2 parameter shall be 14 hexadecimal characters. The hexadecimal characters (A through F) shall be coded using the uppercase ASCII characters. If the MS does not know the values for any of the above parameters, the MS shall use the value of 0 for that parameter. For example, if the SID is unknown, the MS shall represent the SID as 0x0000;

NOTE 1: The SID value is represented using 16 bits as supposed to 15 bits as specified in 3GPP2 C.S0005-D [85].

EXAMPLE: If SID=0x1234, NID=0x5678, PZID=0x12, BASE_ID=0xFFFF, the ci-3gpp2 value is set to the string "1234567812FFFF".

6) if the access type field is set to "3GPP2-1X-HRPD", a ci-3gpp2 parameter set to the ASCII representation of the hexadecimal value of the string obtained by the concatenation of Sector ID (128 bits) and Subnet length (8 bits) (see 3GPP2 C.S0024-A [86]) and Carrier-ID, if available, (see 3GPP2 X.S0060[86B]) in the specified order. The length of the ci-3gpp2 parameter shall be 34 or 40 hexadecimal characters depending on whether the Carrier-ID is included. The hexadecimal characters (A through F) shall be coded using the uppercase ASCII characters;

EXAMPLE: If the Sector ID=0x12341234123412341234123412341234, Subnet length=0x11, and the Carrier-ID=0x555444, the ci-3gpp2 value is set to the string "12341234123412341234123412341234११555444".

7) if the access type field is set to "3GPP2-UMB" 3GPP2 C.S0084-000 [86A], a ci-3gpp2 parameter is set to the ASCII representation of the hexadecimal value of the Sector ID (128 bits) defined in 3GPP2 C.S0084-000 [86A]. The length of the ci-3gpp2 parameter shall be 32 hexadecimal characters. The hexadecimal characters (A through F) shall be coded using the uppercase ASCII characters;

EXAMPLE: If the Sector ID=0x12341234123412341234123412341234, the ci-3gpp2 value is set to the string "12341234123412341234123412341234".

8) if the access-type field set to one of "IEEE-802.11", "IEEE-802.11a", "IEEE-802.11b" or "IEEE-802.11g", or "IEEE-802.11n", an "i-wlan-node-id" parameter is set to the ASCII representation of the hexadecimal value of the AP's MAC address without any delimiting characters;

EXAMPLE: If the AP's MAC address=00-0C F1-12-60-28, then i-wlan-node-id is set to the string "000cf1126028".

9) if the access-type field is set to one of "ADSL", "ADSL2", "ADSL2+", "RADSL", "SDSL", "HDSL", "HDSL2", "G.SHDSL", "VDSL", "IDSL", the access-info field shall contain a dsl-location parameter obtained from the CLF (see NASS functional architecture);

10) if the access-type field set to "DOCSIS", the access info parameter is not inserted. This release of this specification does not define values for use in this parameter;

11) if the access type field is equal to "3GPP-E-UTRAN-FDD" or "3GPP-E-UTRAN-TDD", a "utran-cell-id-3gpp" parameter set to a concatenation of the MCC, MNC, TAC (as described in 3GPP TS 23.003) and the Evolved Cell Global Identity (as described in 3GPP TS 23.401[7B]), obtained from lower layers of the UE, and is coded as a text string as follows:

Starting with the most significant bit, MCC (3 digits), MNC (2 or 3 digits depending on MCC value), TAC (fixed length code of 16 bits using full hexadecimal representation) and Evolved Cell Global Identity (fixed length code of 28 bits using a full hexadecimal representation); and 11a) if the access type field is equal to "3GPP-E-UTRAN-FDD" or "3GPP-E-UTRAN-TDD", a "NW-provided-VoIMS-indicator" parameter is included if NW-provided-VoIMS-indicator is obtained from lower layers of the UE;

12) if the access-type field is set to one of "IEEE-802.3", "IEEE-802.3a", "IEEE-802.3e", "IEEE-802.3i", "IEEE-802.3j", "IEEE-802.3u", "IEEE-802.3ab", "IEEE-802.3ae", IEEE-802.3ak", IEEE-802.3aq", IEEE-802.3an", "IEEE-802.3y", "IEEE-802.3z" or "IEEE-802.3y" and NASS subsystem is used, the access-info field shall contain an eth-location parameter obtained from the CLF (see NASS functional architecture).

NOTE 2: The "cgi-3gpp", the "utran-cell-id-3gpp", the "ci-3gpp2", the "i-wlan-node-id", eth-location, and the "dsl-location" parameters described above among other usage also constitute the location identifiers that are used for emergency services.

In another embodiment, a UE indicates a change in preference. For example, a user may change its preference for receiving voice over PS to receiving voice over CS. An SCC AS or TADS can perform service continuity in the event the preference changes and sessions with voice media exist towards the UE. A preference change can be indicated using the Ut interface and XCAP or using a SIP message. For example, the UE could re-register using a SIP REGISTER request or the UE could transmit a SIP message (if only a particular session needs to receive service continuity (e.g. transferred to the CS domain)) such as a SIP UPDATE request or SIP INVITE request. The SIP message can include an indicator indicating the preference. The indicator can be encoded as a header field value or a body part such as an XML body part. Such an indicator may assume values including "Voice Centric" or "Data Centric", and "CS Voice only", "IMS PS voice only", "CS voice preferred, IMS voice secondary" or "IMS voice preferred, CS voice secondary". In particular, the P-Access-Network-Info header field can include such an indicator. Such an indicator does not necessarily apply only to E-UTRAN. The indicator may also apply to other access types and access classes indicated in Table 2.

In another implementation, the indicator may be implicitly defined by the UE omitting one or more indicators or flags. For example, the UE may omit certain feature tags in the SIP Method e.g. feature tag "sip.audio" [RFC 3840 Indicating User Agent Capabilities in the Session Initiation Protocol (SIP)]. When the network node (e.g. SCC AS) receives the lack of the feature tag, the network node will know that when a session is to be terminated on that UE the TADS function will take this into account.

In both of the above cases (explicit and implicit signaling), the P-Access-Network-Info header field may be extended to include specific information relating to particular access technologies.

For certain access technologies, the P-Access-Network-Info header field may be further extended to include an "IMS Voice over PS session supported" indicator. Possible information conveyed by such an indicator could be Boolean (e.g. presence of the indicator means support, absence means support unknown or lack of support); or there may be 3 types of information: presence of the indicator set to a positive value means support, absence means support unknown, and presence of the indicator set to a negative means lack of support.

If the UE is configured for Voice over IMS, the UE and the Service Domain Selection (SDS) functionality in the network should take the "IMS voice over PS session supported indication" into account. IMS voice calls (with the voice bearer in the PS domain) should be delivered only using the RAT where the "IMS voice over PS session supported indication" applies and indicates support.

For UEs configured to use IMS for voice calls whenever IMS is supported by the RAT, user services shall be supported by the IM CN subsystem and mobile terminated calls should be routed to the IP Multimedia (IM) Core Network (CN) subsystem.

As the IMS AS detects information or a change in the information describing a lower layer's (e.g. NAS layer) support (e.g. the UE indication about the "IMS Voice over PS session supported indication" being available at the NAS level and indicating support) in a SIP message, the IMS AS may store a related indication, effecting a change in procedures. For example, depending on the information received regarding the "IMS Voice over PS session supported" indicator, an IMS AS may target mobile terminated SIP calls that include a voice media component to the CS domain. In some implementations, the TADS function typically provides this function.

Terminating Access Domain Selection (TADS) selects CS access and/or one or more PS access network(s) to be used to deliver a terminating session to the UE. TADS is a functionality located in the IMS and, optionally, in the UE.

For terminating sessions, TADS is always performed after the terminating services. The T-ADS may take following factors (but not limited to) into account for the selection decision: 1) The state of the UE in the circuit switched (CS) domain (this state information shall be included: Detached, Attached); 2) The state of the UE in the IMS (the state information shall include: Registered, Unregistered); 3) the UE capabilities; 4) optionally, the UE indication about the "IMS voice over PS session supported indication" being available at the NAS level and indicating support; 5) the UE indication of ICS support; 6) the access network capabilities; 7) the domains/access types used by an existing session; 8) the media components included in the incoming session; and 9) User preferences and operator policy.

In addition, the P-Access-Network-Info header field or another header field may be extended to indicate preferences including "Voice Centric" or "Data Centric", and "CS Voice only", "IMS PS voice only", "CS voice preferred, IMS voice secondary" or "IMS voice preferred, CS voice secondary". The header field may be included in a SIP message when a preference change occurs. Such a SIP message may be transmitted when the user prefers to receive the voice media over a particular access (e.g. CS) for a particular SIP session only (for the duration of the policy or preference). Alternatively, the preference change can be indicated in another message, e.g. as part of the XCAP protocol.

Figure 13:
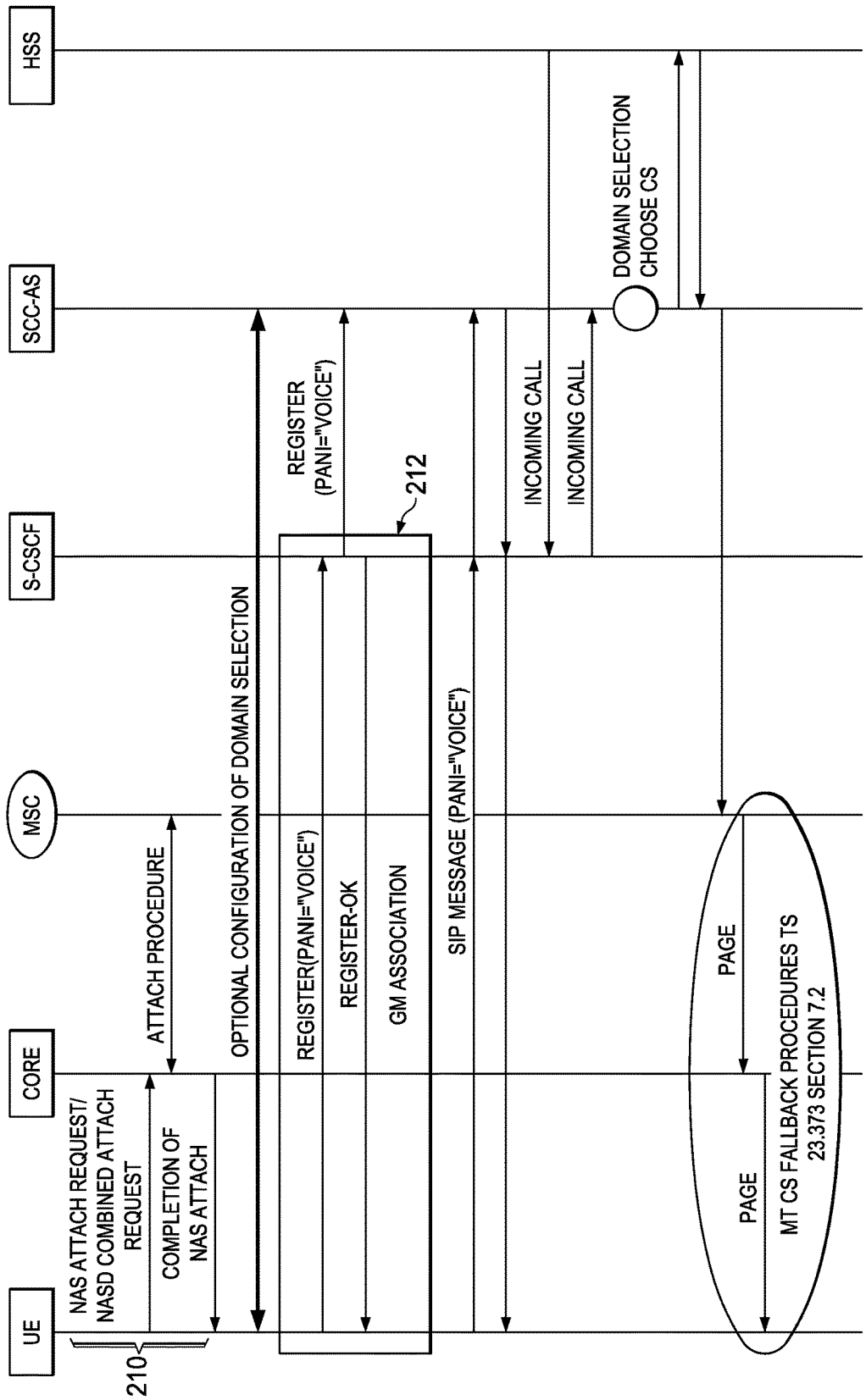
FIG. 13 is an illustration of a message flow for establishing a connection between a UE and a network, wherein the network does not support a service or feature desired by the UE and the UE registers for non-voice services.

FIG. 13 is an illustration of a message flow for establishing a connection between a UE and a network, wherein the network does not support a service or feature desired by the UE and the UE registers for non-voice services. In FIG. 13 the UE connects to the PS Domain using an LTE RAT (i.e. over GERAN/UTRAN PS or EPC/LTE). In steps 210, the UE performs a NAS Attach procedure or NAS Combined Attach procedure when attaching to LTE, or performs a NAS TAU (Tracking Area Update) procedure or NAS Combined TAU when moving to LTE from another access or when moving to a different tracking area. As part of gaining connectivity to the PS Domain, the UE discovers that a service or functionality the UE requires is not supported by way of a flag or indicator that may be broadcast, or provided in a point-to-point message (e.g., a network to wireless device message containing the settings of the VoIMS and SRVCC flag, indicator, or identifier).

In one implementation, the UE may discover the lack of service or functionality by requesting connectivity with either a NAS Attach procedure, NAS Combined Attach procedure, Tracking Area update (TAU) procedure or Routing Area Update procedure. In response, certain messages that the UE receives back from the network upon successful completion of the procedure may include a flag that indicates that VoIMS is not supported.

The UE may then register with the IMS network including the flag/indicator as identified above in steps 212. The indicator may be passed to the network node that is responsible for selecting how to deliver a mobile terminated sessions (e.g. the Terminating Access Domain Selection (TADS) function in the IMS AS).

If the UE is involved in any other SIP Methods, the UE may update any associated indicators if the properties of the network change using a mechanism as described above.

When a mobile terminated session arrives, the session is delivered to the network node responsible for deciding how to route the service. The TADS may be aware that the UE registered over the PS Domain does not support the desired service. The lack of service support may be identified by one or more of a) the flag or indicator that was registered with the IMS system, b) the optional configuration data setting in the TADS, and c) further criteria that may also be used to make a decision how to route the call.

TADS may then choose an alternative target address that may include the identity of the wireless device in the CS Domain (for example, MSISDN for GERAN/UTRAN CS). This may require the IMS AS to query the HSS to obtain the Mobile Station Routing Number (MSRN)/CS Routing Number (CSRN) to locate the correct MSC. The session may then be delivered to the wireless device using traditional CS fallback procedures by routing the call to the MSC that will then page the UE over the SGs interface.

In the present examples, although the discussion is primarily directed to LTE and GERAN/UTRAN, the various RATs may include, and not be limited to, one or more of the following:

TABLE 3

| access-type | "IEEE-802.11" / "IEEE-802.11a" / "IEEE-802.11b" / "IEEE-802.11g" / "IEEE-802.11n" / "3GPP-GERAN" / "3GPP-UTRAN-FDD" / "3GPP-UTRAN-TDD" / "3GPP-E-UTRAN-FDD" / "3GPP-E-UTRAN-TDD" / "ADSL" / "ADSL2" / "ADSL2+" / "RADSL" / "SDSL" / "HDSL" / "HDSL2" / "G.SHDSL" / "VDSL" / "IDSL" / "3GPP2-1X" / "3GPP2-1X-HRPD" / "3GPP2-UMB" / "DOCSIS" / "IEEE-802.3"/ "IEEE-802.3a" / "IEEE-802.3e" / "IEEE-802.3i"/ "IEEE-802.3j" / "IEEE-802.3u" / "IEEE-802.3ab"/ "IEEE-802.3ae"/"IEEE-802.3ak"/IEEE-802.3aq"/ "IEEE-802.3an" / "IEEE-802.3y"/ "IEEE-802.3z"/ "IEEE-802.3y"/ token |
|---|---|

Because the PCC interacts with the EPC network during NAS attach procedures to LTE and GERAN/UTRAN, Tracking Area Update, Combined Tracking Area Update and Routing Area Updates respectively, the PCC may be provided with the VoIMS Indicator that applies to the TA or RA, respectively. For example, 1) if the TA the UE is attaching to supports the VoIMS, the MME sets the VoIMS Indicator to "supported". If it is does not support the VoIMS, the MME sets the VoIMS Indicator to "not supported". 2) If the TA the UE is establishing the PDN connectivity in supports VoIMS, the MME sets the VoIMS Indicator to "supported." If it does not support VoIMS, the MME sets the VoIMS Indicator to "not supported". 3) If the TA or RA the UE is moving to supports VoIMS, the MME sets the VoIMS Indicator to "supported". If it does not support VoIMS, it sets the VoIMS Indictor to "not supported". 4) If the RA the UE is moving to supports VoIMS, the SGSN sets the VoIMS Indicator to "supported". If it does not support VoIMS, the SGSN sets the VoIMS Indictor to "not supported." 5) If the RA the UE is currently camping in supports VoIMS, the SGSN sets the VoIMS Indicator to "supported". If it does not support VoIMS, the SGSN sets the VoIMS Indicator to "not supported". As such, the PCC may always be informed of support for VoIMS in the specific RAT and the area in which the UE is located.

Accordingly, in one implementation of the present system, information describing support of VoIMS by the PS Domain that is sent by the UE to the IMS infrastructure may be policed, asserted or amended by a SIP server or SIP proxy in the network (e.g. to verify if it is correct). For example, a P-CSCF may interact with the PCC. Based upon the response received from the PCC-capable functional elements, a P-CSCF may police, assert or amend the P-Access-Network-Info header field value. As such, the network may be aware of how to appropriately deliver calls. Note that this implementation of the system may be implemented in conjunction with or apart from any one or more of the various implementations discussed throughout the present disclosure.

In some implementations of the present system, a race condition may exist. A Mobile-Terminated SIP request with a voice or speech media component may be received by the IMS AS while the UE's information about lower layer's support (e.g. indicating the "IMS Voice over PS session supported" indicator) has not yet been updated in the IMS AS' related indication (i.e. the information the UE has provided to the IMS AS). As a result, the procedures applied to the Mobile-Terminated SIP request with voice or speech media component may be inappropriate.

Requiring a UE to send a SIP message as soon as the UE's information about lower layer support changes reduces the time window during which the procedures may be inappropriate. As an example, a SIP message may generate a refresh of the SIP registration, e.g. using a SIP REGISTER request. A UE may also apply IUT or redirection and forward the request with a conversational voice indication to an interface that supports the required capability. Alternatively, the PCC functional element may signal the inability to support the service due to lack of availability of resources.

As discussed above, the IMS functional elements of a particular network implementation may not always have the most up-to-date information describing the services supported by the access network. As such, in one system implementation where the UE is an ICS-capable UE, it is the UE that makes the final determination as to whether the Mobile-Terminated (MT) calls shall be delivered over IMS or over CS. During the IMS registration, the UE signals to the IMS that the UE has the capacity to support ICS.

After registering, when a Mobile-Terminated call reaches the IMS, the SCC AS may send a SIP request to the UE that may include an SDP media component for delivery of media over an IP RAT (EPC or GERAN/UTRAN PS) and/or an indicator for delivery of media over the CS domain. In this example, the SCC AS always includes the additional SDP media component for delivery of media over the CS domain. It is then the UE that ultimately decides which domain to use for receiving the Mobile-Terminated session based upon information the UE has on the availability of voice solutions (e.g. VoIMS Flag and an ability to access GERAN or UTRAN). In cases where the UE does not include an indication to support ICS by the inclusion of the ICS media tag, the IMS AS need not insert the SDP that allows CS to be used for voice bearer.

Note that this approach may require an additional SIP message exchange compared to the case where the network was aware of the value of the "IMS Voice over PS session supported" indicator for the targeted UE.

If the IMS Service Centralization and Continuity is not used and if a subscriber is subscribed to both the CS domain and the IMS, the UE is attached to the CS domain, and the PS Domain is selected to deliver the mobile terminated session to the UE but the delivery fails because of any of the following reasons: 1) The UE rejects the delivery of the IMS voice calls (with the voice bearer in the PS domain) because in the RAT in use by the UE the "IMS voice over PS session supported indication" does not indicate support or is not available; or 2) The EPC rejects the establishment of the bearers required for the IMS voice calls because in the RAT the "IMS voice over PS session supported indication" does not indicate support or is not available then the session that arrived in the IMS may need to be routed to the CS Domain as described herein.

Figure 14:
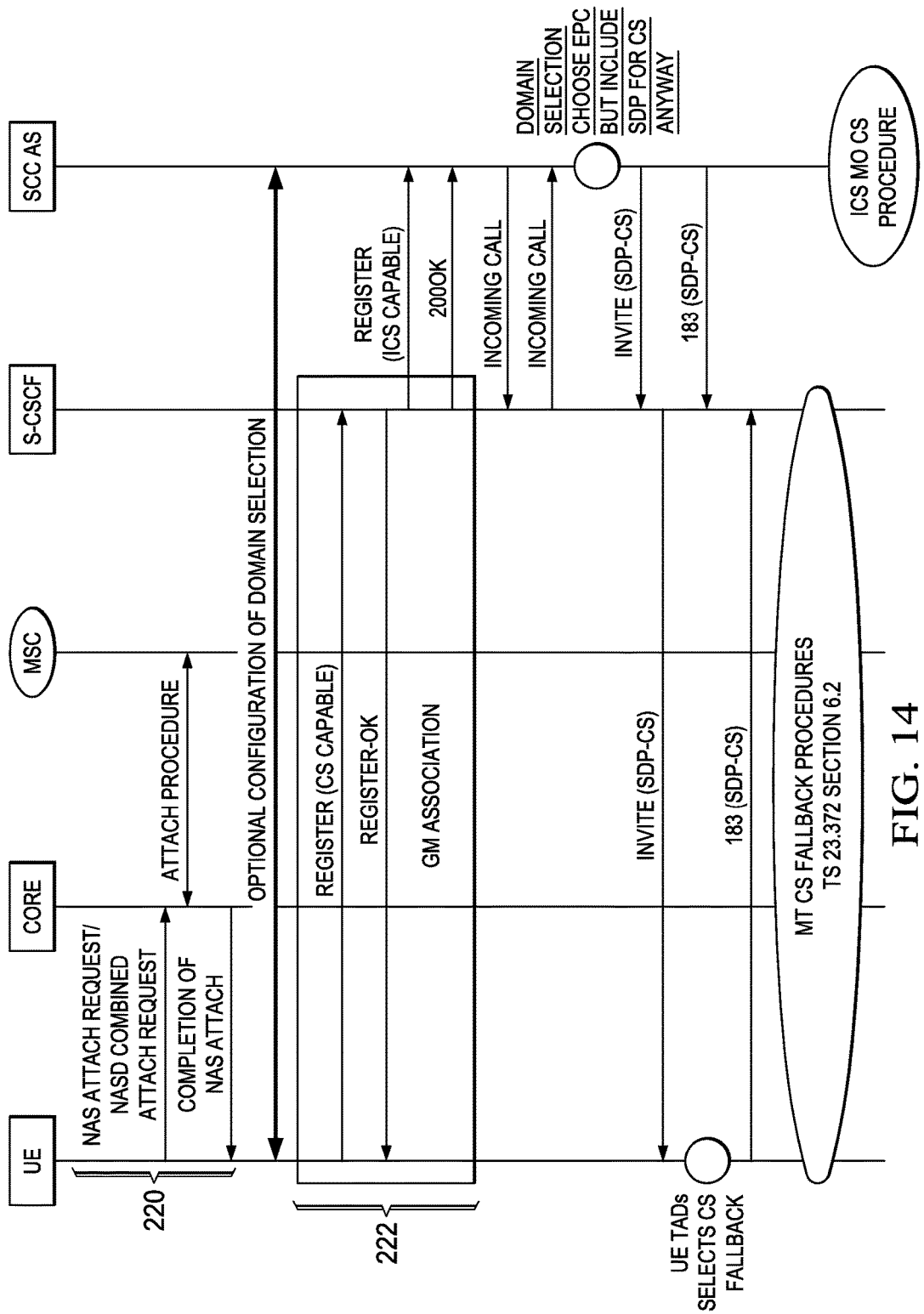
FIG. 14 is an illustration of a message flow for establishing a connection between a UE and a network, wherein the UE does not take into account service or function indicators provided by the network.

FIG. 14 is an illustration of a message flow for establishing a connection between a UE and a network, wherein the UE does take into account service or function indicators provided by the network (e.g. VoIMS Indicator that has been obtained from the network when Attaching to the RAT).

In steps 220, the UE performs a NAS Attach procedure or NAS Combined Attach procedure. The UE registers with the IMS system including typical feature tags and no indications related to the VoIMS Indicator in steps 222. One of the feature tags or indicators may be an ICS feature tag. When the network mode e.g. SCC AS receives the REGISTER message the SCC AS stores information received in the 3rd party registration (e.g., the ICS feature tag). When the SCC AS receives an incoming call it may be aware that the UE receiving the incoming call is registered on LTE, as the UE or P-CSCF may have included the P-ACCESS-NETWORK-INFO header indicating an LTE type RAT. However, unless the SCC AS received the optional configuration domain information as described above, the SCC AS may not know whether the LTE network supports IMS voice. As a result, the TADS may choose an LTE UE target. If the LTE (or the PS Domain in general) is chosen to deliver the incoming call, because the UE has not provided any domain configuration information and the UE is registered with IMS, the IMS AS will construct an SDP offer that contains Media lines that support both CS and LTE for voice access assuming the ICS feature tag was included. Otherwise, the CS part of the SDP offer may be omitted. An example of an INVITE containing the CS part of the offer is illustrated below in Table 4.

TABLE 4

INVITE sip:user2_public1@home1.net SIP/2.0
Via: SIP/2.0/UDP sccas.home1.net;branch=z9hG4bKnas34r5
Max-Forwards: 65
Route: <sip:cb03a0s09a2sdfglkj490333@scscf1.home1.net;lr>;orig-dialog-
id="O:73935718_92645110-712786jd246395302d-zKE"
Record-Route:<sccas.home1.net;lr>
P-Access-Network-Info:
P-Asserted-Identity:
P-Charging-Function-Addresses: ccf=[5555::b99:c88:d77:e66];
ccf=[5555::a55:b44:c33:d22];
ecf=[5555::1ff:2ee:3dd:4ee]; ecf=[5555::6aa:7bb:8cc:9dd]
P-Charging-Vector:
P-Asserted-Service:
Accept-Contact: *;+g.3gpp.icsi-ref="urn%3Aurn-7%3gpp-service.ims.-
icsi.mmtel"
Accept-Contact: *;;+g.3gpp.ics="server;explicit;require"
Privacy:
From: <sip:user2_public1@home2.net>;tag=171828
To:
Call-ID:
Cseq:
Supported:
Accept:
Contact:
Allow:
Content-Type:
Content-Length:
v=0
o=2987933615 2987933615 IN IP6 5555::eee:ccc:aaa:bbb
s=-
c=IN IP6 5555::eee:fff:aaa:bbb
t=0 0
m=audio 49170 RTP/AVP 97 3 98
a=creq:med-v0,ccap-v0
a=mcap:1 97
a=mcap:2 GSM/8000/1

TABLE 4-continued

```
a=mcap:3 98
a=mcap:4 -
a=tcap:1 RTP/AVP RTP/AVPF PSTN
a=ccap:1 IN IP6 5555::eee:fff:aaa:bbb
a=ccap:2 PSTN E164 +12125556666
a=acap:1 setup:actpass
a=acap:2 connection:new
a=acap:3 rtpmap:97 AMR
a=acap:4 fmtp:97 mode-set=0,2,5,7; maxframes=2
a=acap:5 rtpmap:98 telephone-event
a=pcfg:1 t=1 m=1,2,3 c=1 a=3,4,5
a=pcfg:2 t=2 m=1,2,3 c=1 a=3,4,5
a=pcfg:3 t=3 m=4 c=2 a=1,2
a=curr:qos local none
a=curr:qos remote none
a=des:qos mandatory local sendrecv
a=des:qos optional remote sendrecv
```

Upon receipt of the SIP INVITE, the UE analyzes the received SDP options against the UE's options to support the desired service over the PS Domain and the CS Domain taking into account the UE's voice settings and the UE's usage settings (e.g. upon receipt of the INVITE with SDP for voice that supports CS and IP (over LTE) the UE compares this with the settings of the VoIMS flag and SRVCC flag and makes a determination how to process the call—either accept the call over LTE network or perform a call over CS to retrieve the call).

Figure 15:
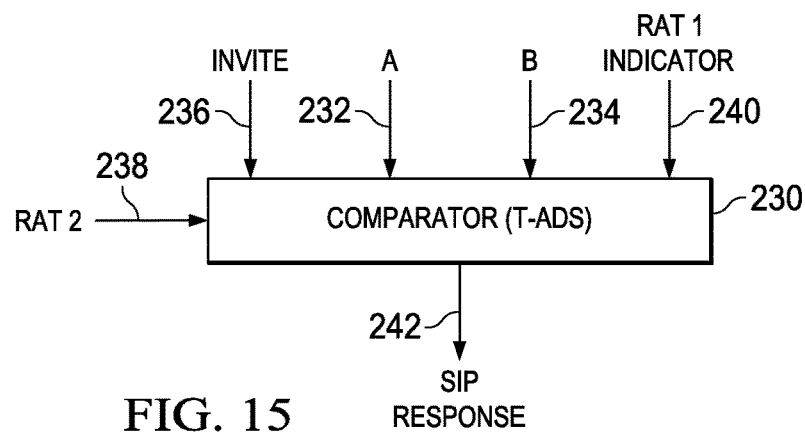
FIG. 15 is a schematic showing a diagrammatic view of the functionality of a Comparator (Terminating Access Domain Selection (T-ADS) function)

FIG. 15 is a schematic showing a diagrammatic view of the functionality of a Comparator (TADS function). Comparator 230 includes inputs A 232 and B 234. In one implementation, input A 232 is allocated to the UE voice settings, and input B 234 is allocated to the UE usage settings. Additional inputs are defined for SIP INVITE messages (SDP contains the ability to use current RAT and alternative RAT for service) (input 236), RAT 2 messages to support services like Dual Transfer Mode (DTM), IMS, etc. (input 238), and RAT 1 Indicators (service is not available on this RAT, e.g., no VoIMS) (input 240). Based upon the inputs, Comparator 230 is configured to output a SIP Response 242. Even though FIG. 15 illustrates one specific implementation of Comparator 230, various capabilities of Comparator may include the receipt of information retrieved by broadcast information or from point-to-point messages. Broadcast information could be but not limited to the support for DTM, GPRS, EDGE etc. Point-to-point information could be but not limited to "VoIMS support", "SRVCC support" etc.

In one implementation of the present system, the following pseudo code may be used to describe what the UE does when the VoIMS flag is set in a negative way but could equally apply is the UE wants SRVCC and that is not supported.

TABLE 5

```
IF UE Voice - CS or IMS preferred
    THEN IF INVITE SDP with CS offer
        THEN IF UE is data centric
            THEN Send SIP response e.g. 183 SDP Answer with CS or
If the SDP contains voice components, the media line associated with CS
offer (voice component) port shall be set to zero or a=inactive and the
other SDP M lines shall be accepted per existing standards.
        ELSE IF the UE is voice centric
            THEN Send SIP response e.g. 183 SDP Answer with CS
        ELSE IF INVITE SDP no CS offer
            THEN IF UE is data centric
    THEN IF only voice offered
        THEN Send SIP Error (message needs to be it does not trigger alternative
domain selection i.e. not a 488)
```

TABLE 5-continued

```
    ELSE IF SDP offer contains other media
        THEN Send SIP response e.g. 183 with media lines containing voice with
ports set to 0.
    ELSE IF UE is voice centric
        THEN Send SIP error 488 that triggers selection in alternative domain
per 3GPP TS 24.292 sub-clause 10.2.4
```

In the pseudo code of Table 5, the error cause may indicate none of the SDPs are OK. If so, the UE may then include a list of SDPs that the UE would accept including, at least, the SDP-CS. The IMS AS, upon receiving an error message, may return the SDP-CS to the UE.

The following pseudo code is one example of a series of steps that the UE may implement when the VoIMS flag is set in a positive way.

TABLE 6

```
IF UE is Voice - CS preferred
    THEN IF INVITE SDP with CS offer
        THEN IF UE is data centric
            THEN Send SIP response e.g. 183 SDP Answer with CS
        ELSE IF UE is voice centric
            THEN Send SIP response e.g. 183 SDP Answer with CS
    ELSE IF INVITE SDP no CS offer
        THEN Send SIP response e.g. 183 SDP Answer with IMS voice or Send
back SIP error e.g. 488. In response to receiving said SIP error, the
network node or IMS AS is triggered to select alternative domain
or RAT
ELSE IF UE is Voice - IMS preferred
    THEN IF INVITE SDP with CS offer
        THEN if UE is data centric
            THEN Send SIP response e.g. 183 SDP Answer with
                IMS voice
        ELSE IF UE is voice centric
            THEN Send SIP response e.g. 183 SDP Answer with
                IMS voice
    ELSE IF INVITE SDP no CS offer
        THEN Send SIP response e.g. 183 SDP Answer with IMS voice
```

An example of the above as implemented in 3GPP TS 24.292 is shown below:

When the ICS UE receives, within an initial SIP INVITE request, an SDP Offer which allows the UE to select between using an RTP-based IP bearer or a CS bearer for an audio session, i.e. in which for the audio media line the following is set:
  the transport protocol within the media line to RTP-based IP bearer;
  the related connection line to an IP address; and
  additional a-lines as defined in draft-ietf-mmusic-sdp-capability-negotiation [40], draft-garcia-mmusic-sdp-misc-cap [39], draft-ietf-mmusic-sdp-cs [36] and draft-ietf-mmusic-sdp-media-capabilities [41] indicating the following:
    the media capability attribute "mcap" set to "-";
    the transport protocol capability attribute "tcap" set to "PSTN"; and
    the connection data capability attribute "ccap" set to "PSTN", indicating "E.164" as address type and the address set to the SCC AS PSI DN;
  and the ICS UE supports TADS execution, the ICS UE shall,
    a) if the UE is on LTE and the UE is
      a. CS only and has performed a successful combined attached then the UE shall use CS bearer
      b. CS only and has not performed a successful combined attached the ICS UE shall send back a 606 (Not Acceptable).
        i. Alternative—If the VoIMS over flag is set the UE shall use RTP-based IP bearer.

ii. Alternative—If the VoIMS over flag is not set then the ICS UE shall send back a 606 (Not Acceptable).

c. CS preferred and has performed a successful combined attached then the UE shall use the CS bearer i. Alternative—CS preferred, has performed a successful combined attached, VoIMS over flag is set however the SDP contains other media as well as voice then the UE shall use RTP-based IP bearer d. CS preferred and not performed a successful combined attached and the VoIMS Indicator is set and i. If the UE indicated it wanted SRVCC in the EPC Attach as described in 3GPP TS 24.301 and SRVCC is available the UE shall use RTP-based IP bearer.

ii. If the UE indicated it wanted SRVCC in the EPC Attached as described in 3GPP TS 24.301 and SRVCC is not available the ICS UE shall send back a 606 (Not Acceptable).

iii. If the UE indicated it did not want SRVCC as described in 3GPP TS 24.301 then the US shall use RTP-based IP bearer.

e. CS preferred and not performed a successful combined attached and the VoIMS Indicator is not set the ICS UE shall send back a 606 (Not Acceptable).

f. IMS only and the VoIMS Indicator is set and i. If the UE indicated it wanted SRVCC in the EPC Attach as described in 3GPP TS 24.301 and SRVCC is available the UE shall use RTP-based IP bearer.

ii. If the UE indicated it wanted SRVCC in the EPC Attached as described in 3GPP TS 24.301 and SRVCC is not available the ICS UE shall send back a 606 (Not Acceptable).

iii. If the UE indicated it did not want SRVCC as described in 3GPP TS 24.301 then the US shall use RTP-based IP bearer.

g. IMS only and the VoIMS Indicator are not set the ICS UE shall send back a 606 (Not Acceptable).

h. IMS preferred and the VoIMS Indicator is set and i. If the UE indicated it wanted SRVCC in the EPC Attach as described in 3GPP TS 24.301 and SRVCC is available the UE shall use RTP-based IP bearer.

ii. If the UE indicated it wanted SRVCC in the EPC Attached as described in 3GPP TS 24.301 and SRVCC is not available and 1. the UE performed a successful combined attached shall use CS bearer.

2. the UE did not perform a successful combined attached the ICS UE shall send back a 606 (Not Acceptable).

iii. If the UE indicated it did not want SRVCC as described in 3GPP TS 24.301 then the US shall use RTP-based IP bearer.

i. IMS preferred and the VoIMS Indicator is not set and has performed a successful combined attached the UE shall use CS bearer.

b) if the UE is on GERAN/UTRAN based on local configuration and network conditions, decide whether to use for the related audio media stream an RTP-based IP bearer or a CS bearer.

If the ICS UE decides to use a RTP-based IP bearer, the ICS UE shall proceed as described in sub clause 10.2.2.2 and in addition indicate that the RTP-based IP bearer is used within the SDP answer in accordance with draft-ietf-mmusic-sdp-capability-negotiation [40].

If the ICS UE decides to use a CS bearer, the ICS UE shall proceed as described in sub clause 10.2.2.3 and in addition indicate that the CS bearer is used within the SDP answer in accordance with draft-ietf-mmusic-sdp-capability-negotiation [40].

Figure 16:
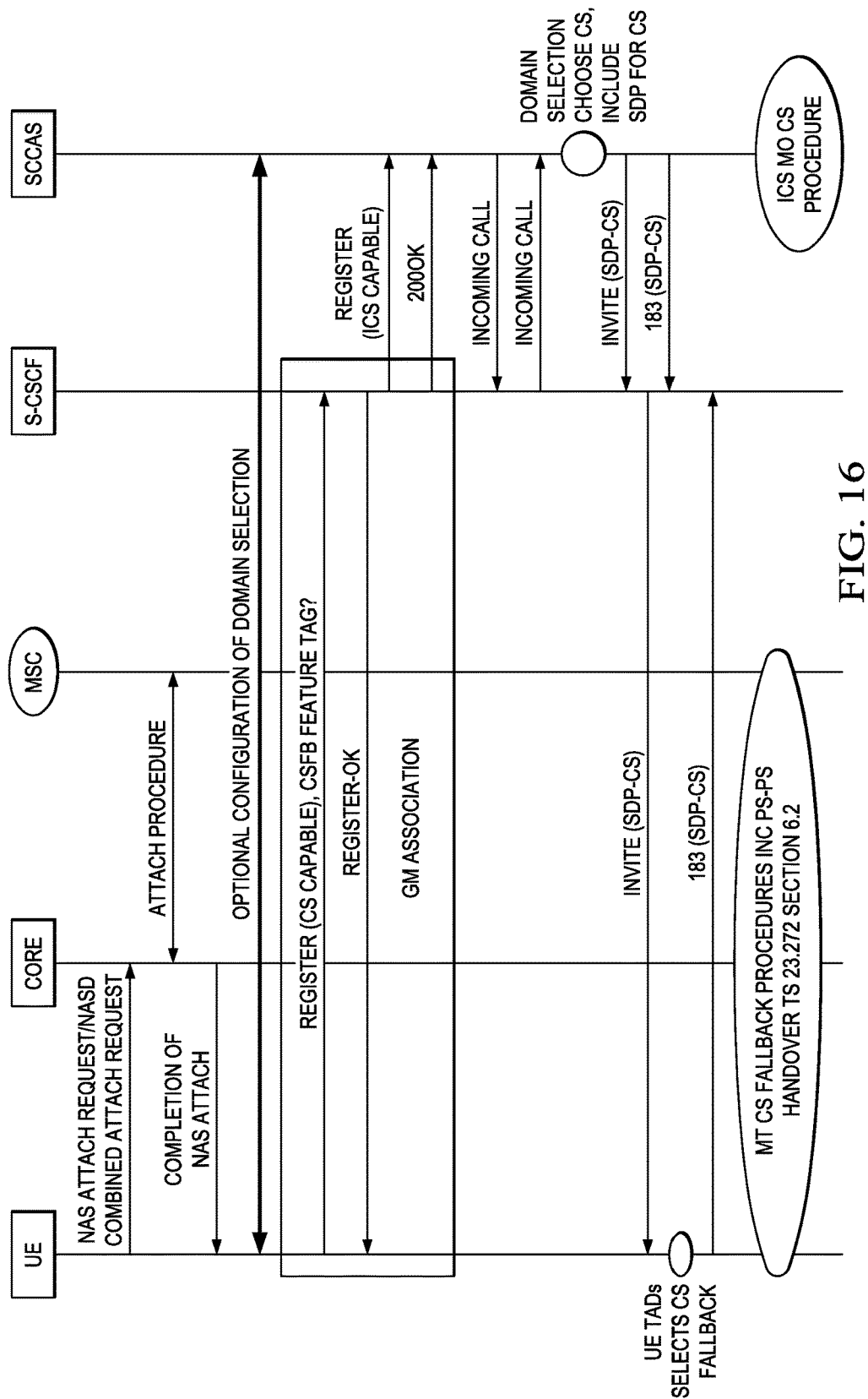
FIG. 16 is an illustration of a message flow for establishing a connection between a UE and a network, wherein the UE includes a feature tag used to trigger the IMS AS to include the SDP-CS when and if the UE has had a successful registration for CS Fallback.

FIG. 16 is an illustration of a message flow for establishing a connection between a UE and a network, wherein the UE includes a feature tag used to trigger the IMS AS to include the SDP-CS when and if the UE has had a successful registration for CS Fallback. If CS fallback was not successful the feature tag may not be included.

The feature tag may be transported in the SIP registration to the IMS AS. In this instance, the SCC AS behavior may be changed by the inclusion of the tag. If the tag has been included and an ICS-capable tag is present, the IMS AS may construct SIP messages towards the UE containing SDP with CS portion (see draft-ietf-mmusic-sdp-cs). However, if the CS fallback tag was not included, the SDP with CS portion need not be included.

In many network implementations, the VoIMS Indicator is given to the UE by the MME or SGSN during initial attach and/or TAU and/or Combined TAU and/or RA update respectively. As a result, when the VoIMS is provided by the MME and SGSN to the UE, the MME and the SGSN are aware of whether IMS voice can be supported over a specific TA or RA respectively.

When a mobile terminated call reaches the IMS and the UE is registered with the IMS, the call may be routed to the UE. When the UE accepts the call to be routed using the IMS/over the PS Domain, the IMS may need to establish the necessary radio bearers for the bearer's activation, and the IMS may interact with the PCC to do so.

In one implementation of the present system, because the PCC interacts with the EPC during NAS Attach, Tracking Area Update, Routing Area Updates, and PDP Context Activation in GERAN/UTRAN respectively, the PCC may be provided with the VoIMS Indicator that applies to the TA or RA respectively. As a result, the PCC may always be informed of support for VoIMS in the specific RAT and area in which the UE is located.

When the IMS interacts with the PCC to establish the bearers for the service after the UE accepts the call to be routed using the IMS/over the PS Domain, based upon the request incoming from the IMS, the PCC may determine whether the service can be supported (for example, depending on the value of the VoIMS Indicator stored in the PCC) and accept or reject the IMS request. The IMS may further provide a reason or explanation for the rejection. In response to any such reason or explanation for the rejection, the IMS may decide to route the mobile terminated call to the UE over the CS domain. Note that in many cases, if a domain or RAT is not available, the session or call may be routed to, for example, voice mail.

To establish bearers for the UE, the EPC may interact with the PCC to perform policing of the bearer's QoS. A bearer establishment procedure may take place upon the UE performing a NAS Attach to LTE, a PDP Context Request procedure over GERAN/UTRAN, and/or a UE Requested PDN Connectivity procedure. During such interaction, the PCC may be provided the value of the VoIMS indicator.

After the IMS interacts with the PCC to establish the bearers for the service after the UE accepts the call to be routed over IMS/PS Domain, the PCC may interact with the EPC or the GPRS core network to establish the necessary bearers or modify the existing bearers. If the UE is located in an area where the service is not supported (e.g. the VoIMS Indicator for the TA or RA indicates that VoIMS is not supported), then the UE may reject the request and inform the PCC of the reason for the rejection. The PCC may then reject the IMS request and may optionally provide a reason for the rejection. In response to the reason for rejection, the IMS may decide to route the mobile terminated call to the UE over the CS domain.

Figure 17:
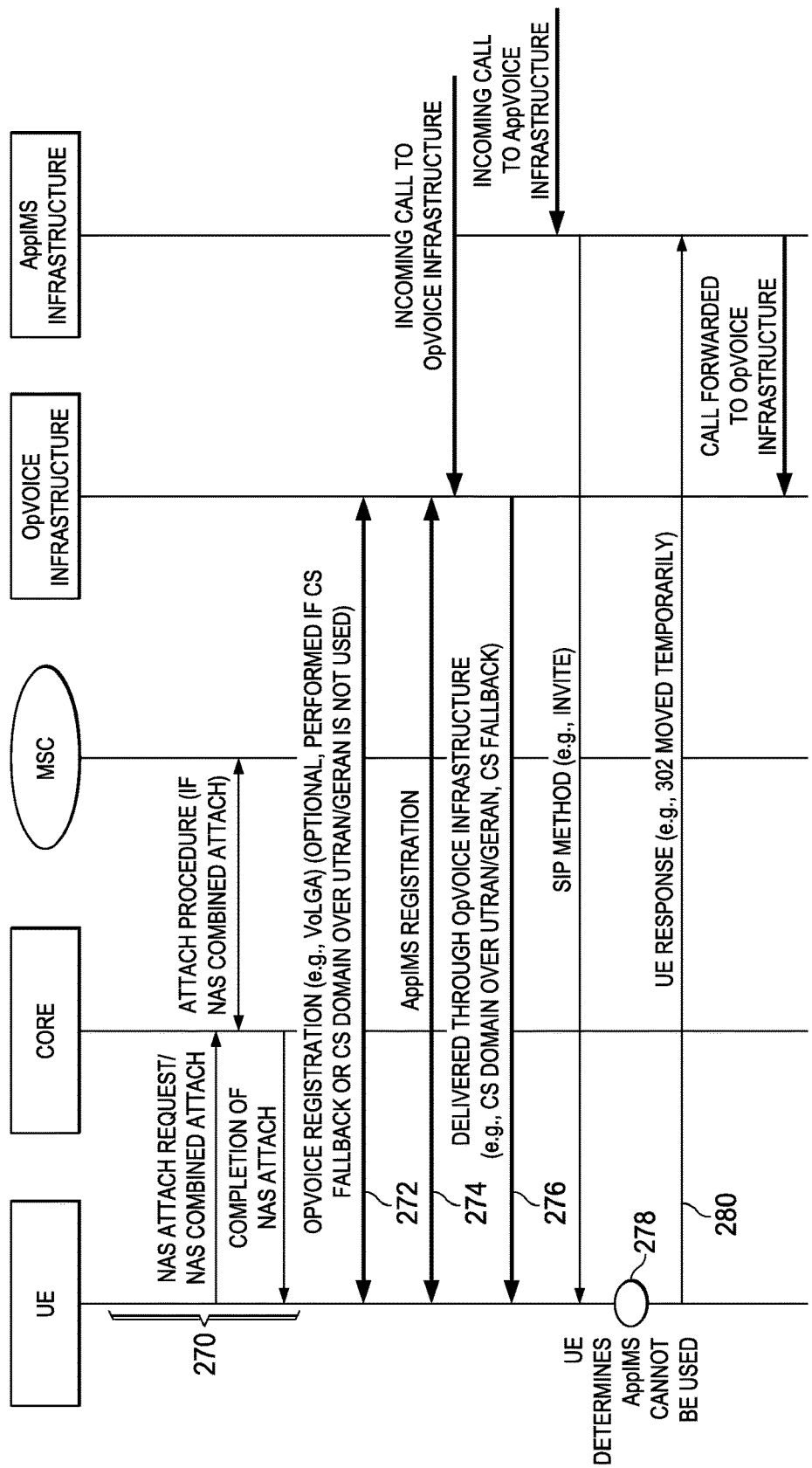
FIG. 17 is an illustration of a message flow for establishing a connection between a UE and a network, wherein the UE inspects the VoIMS indicator and indicates call delivery should take place over an OpVoice solution.

FIG. 17 is an illustration of a message flow for establishing a connection between a UE and a network, wherein the UE inspects the VoIMS indicator and indicates call delivery should take place over an OpVoice solution. In some implementations of the present system, the UE has performed a NAS Attach or NAS Combined Attach. Thereafter, the UE performs OpVoice registration and AppIMS Registration in steps 272 and 274, respectively. If the UE has successfully performed a NAS Combined Attach, CS fallback can be used to deliver an OpVoice session through the OpVoice infrastructure in step 276. Alternatively, if the UE has performed a NAS Attach, the UE can perform a registration with the OpVoice solution (e.g. VoLGA) while connected to LTE. Mobile-Terminated OpVoice calls may be delivered to the OpVoice infrastructure and routed to the UE (e.g. using VoLGA over LTE or triggering CS fallback procedures). Mobile-Terminated AppVoice calls are delivered to the AppIMS infrastructure and routed to the UE. When the UE decides, based on VoIMS indicator in step 278, that the call cannot be delivered over IMS, the UE may indicate to the AppIMS to deliver the call by forwarding it to the OpVoice solution in step 280 (that can be based on CS fallback, CS calls or, for example, VoLGA). The indication may be achieved by the UE receiving a SIP Method, e.g., an INVITE and responding back with the proper response, e.g. 3xx response or in particular the 302 (Moved Temporarily) response, as illustrated in Table 7.

TABLE 7

21.3.3 302 Moved Temporarily

The requesting client SHOULD retry the request at the new address(es) given by the Contact header field (Section 20.10). The Request-URI of the new request uses the value of the Contact header field in the response.

In one implementation, a 302 message is used because the UE may be temporarily unavailable to support the service at this location. As such, the 302 message may provide the location of the OpVoice service (i.e. the contact address of the entity providing the OpVoice service, e.g. an MSC in case of CS fallback or VoLGA or CS services). Messages 300 and 380 may also be used. In the event that a UE is not configured with the contact address of the entity providing the OpVoice service, the UE may include an alternative indicator in the response (e.g. an XML body). One example XML body may be based on 3GPP TS 24.229°s application/3gpp-ims+xml:

```
<3gpp-ims version="1">
  <alternative-service>
    <type>
      <volga/>
    </type>
    <reason/>
  </alternative-service>
</3gpp-ims>
```

In the above XML body, the indicator <volga/> may be included in an XML document which is of MIME type application/3gpp-ims+xml when included in a SIP message as SIP body (part). It is possible that the schema version MIME type parameter and the version attribute in the 3gpp-ims element are set to a value other than "1". In that case, inclusion of the <volga/> indicator may inform the network that the UE wishes to handle the call per Volga procedures.

When the IMS AS receives the response (e.g. a 302 response with the indicator <volga/>) the IMS AS may then send a Mobile-Terminated call request such as a SIP INVITE request to the entity addressed in the contact header (e.g. the MSC which is connected to the VoLGA entity like VANC). Then the VANC may follow the procedures for a VoLGA Mobile-Terminated call.

Figure 18:
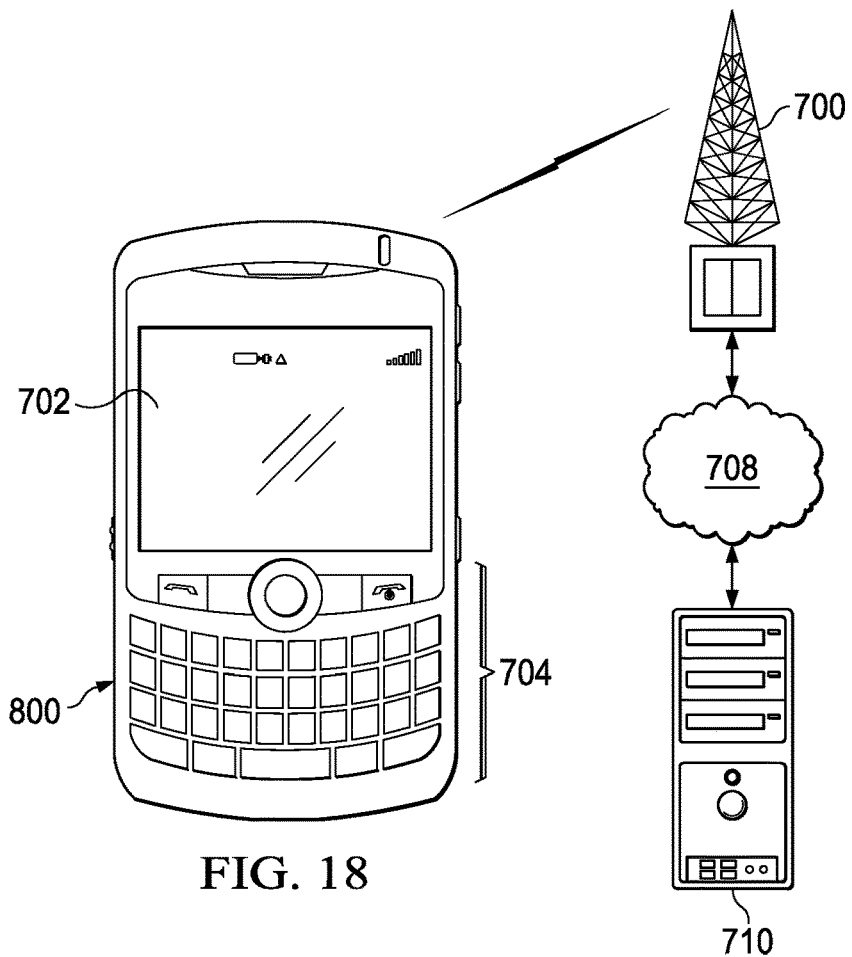
FIG. 18 illustrates a wireless communications system including an embodiment of the user agent.

Referring now to FIG. 18, a wireless communications system including an embodiment of an exemplary UE 800 is illustrated. The UE is operable for implementing aspects of the disclosure, but the disclosure should not be limited to these implementations. Though illustrated as a mobile phone, the UE may take various forms including a wireless handset, a pager, a personal digital assistant (PDA), a portable computer, a tablet computer, a laptop computer, smart phones, printers, fax machines, televisions, set top boxes, and other video display devices, home audio equipment and other home entertainment systems, home monitoring and control systems (e.g., home monitoring, alarm systems and climate control systems), and enhanced home appliances such as computerized refrigerators. Many suitable devices combine some or all of these functions. In some embodiments of the disclosure, the UE 800 is not a general purpose computing device like a portable, laptop or tablet computer, but rather is a special-purpose communications device such as a mobile phone, a wireless handset, a pager, a PDA, or a telecommunications device installed in a vehicle. The UE 800 may also be a device, include a device, or be included in a device that has similar capabilities but that is not transportable, such as a desktop computer, a set-top box, or a network node. The UE 800 may support specialized activities such as gaming, inventory control, job control, and/or task management functions, and so on.

The UE 800 includes a display 702. The UE 800 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a track wheel, an exit or escape key, a trackball, and other navigational or functional keys, which may be inwardly depressed to provide further input function. The UE 800 may present options for the user to select, controls for the user to actuate, and/or cursors or other indicators for the user to direct.

The UE 800 may further accept data entry from the user, including numbers to dial or various parameter values for configuring the operation of the UE 800. The UE 800 may further execute one or more software or firmware applications in response to user commands. These applications may configure the UE 800 to perform various customized functions in response to user interaction. Additionally, the UE 800 may be programmed and/or configured over-the-air, for example from a wireless base station, a wireless access point, or a peer UE 800.

Among the various applications executable by the UE 800 is a web browser, which enables the display 702 to show a web page. The web page may be obtained via wireless communications with a wireless network access node, a cell tower, a peer UE 800, or any other wireless communication network or system 700. The network 700 is coupled to a wired network 708, such as the Internet. Via the wireless link and the wired network, the UE 800 has access to information on various servers, such as a server 710. The server 710 may provide content that may be shown on the display 702. Alternately, the UE 800 may access the network 700 through a peer UE 800 acting as an intermediary, in a relay type or hop type of connection.

Figure 19:
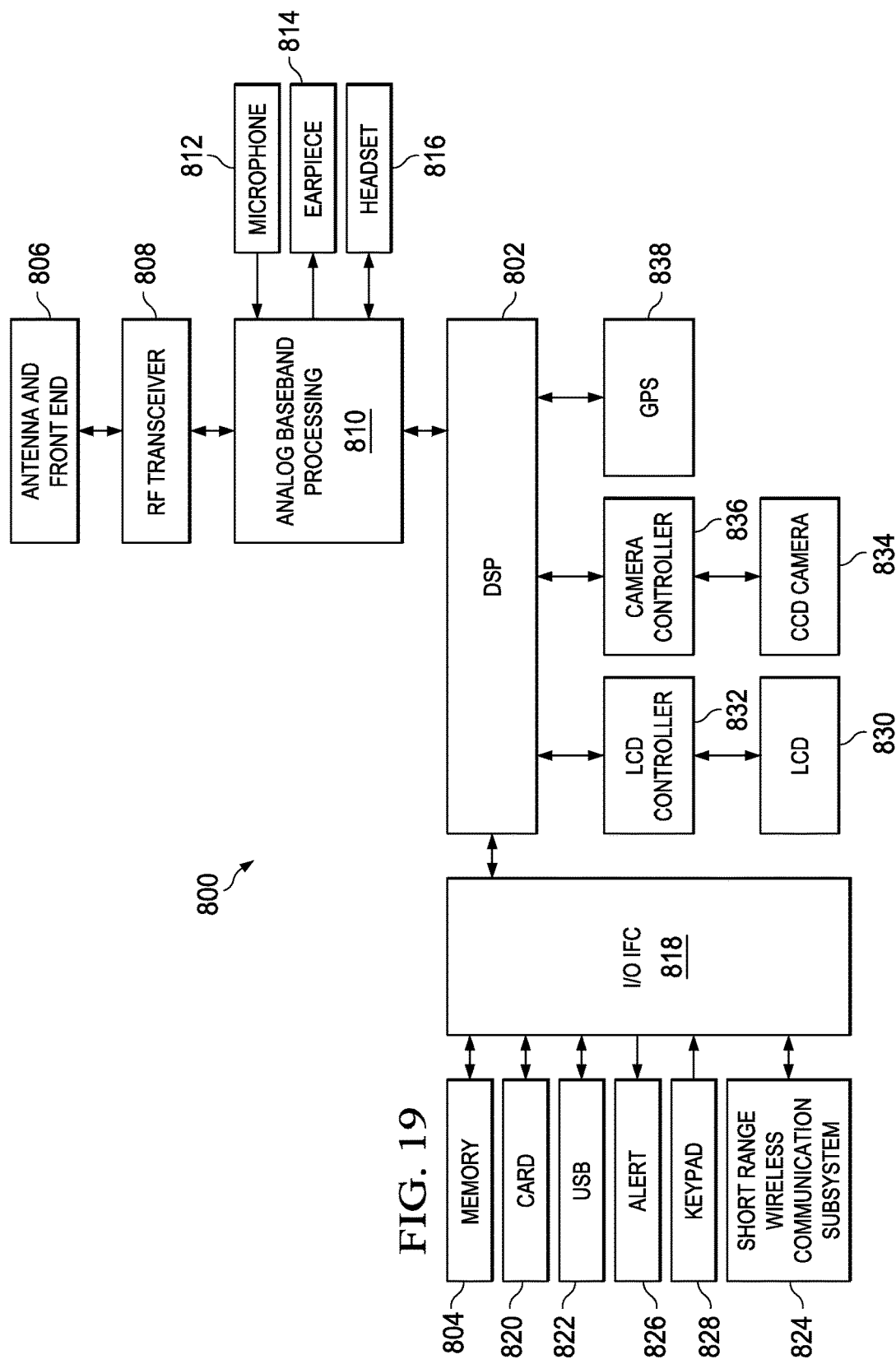
FIG. 19 shows a block diagram of the user agent including a digital signal processor (DSP) and a memory.

FIG. 19 shows a block diagram of the UE 800. While a variety of known components of UAs 10 are depicted, in an embodiment a subset of the listed components and/or additional components not listed may be included in the UE 800. The UE 800 includes a digital signal processor (DSP) 802 and a memory 804. As shown, the UE 800 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UE 800 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UE 800 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UE 800 to send and receive information from a cellular network or some other available wireless communications network or from a peer UE 800. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF transceiver 808, portions of the antenna and front end 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UE 800 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UE 800 and may also enable the UE 800 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UE 800 to communicate wirelessly with other nearby mobile devices and/or wireless base stations.

The input/output interface 818 may further connect the DSP 802 to the alert 826 that, when triggered, causes the UE 800 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UE 800. The keyboard 828 may be a full or reduced alphanumeric keyboard such as QWERTY, Dvorak, AZERTY and sequential types, or a traditional numeric keypad with alphabet letters associated with a telephone keypad. The input keys may include a track wheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UE 800 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UE 800 to determine its position. Various other peripherals may also be included to provide additional functions, e.g., radio and television reception.

Figure 20:
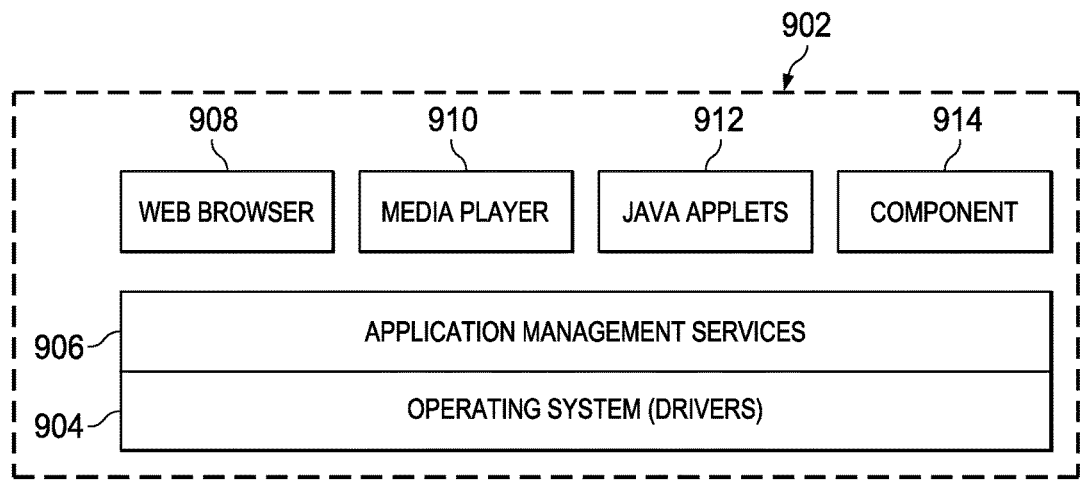
FIG. 20 illustrates a software environment that may be implemented by a processor of a user agent.

FIG. 20 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UE 800. Also shown in FIG. 20 are a web browser application 908, a media player application 910, and Java applets 912. The web browser application 908 configures the UE 800 to operate as a web browser, allowing a user to enter information into forms and select links to retrieve and view web pages. The media player application 910 configures the UE 800 to retrieve and play audio or audiovisual media. The Java applets 912 configure the UE 800 to provide games, utilities, and other functionality. A component 914 might provide functionality described herein.

Figure 21:
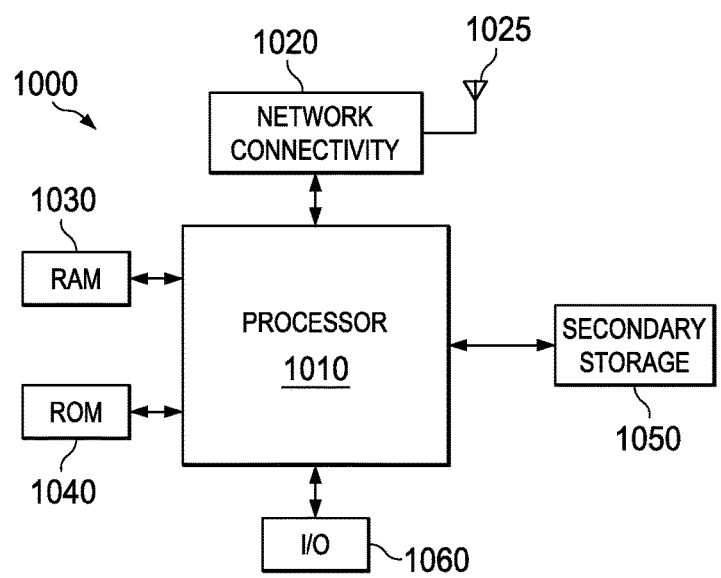
FIG. 21 illustrates an example of a system that includes a processing component suitable for implementing a method for providing continuity for sessions transitioning between networks.

The UE 800, access device 120, and other components described above might include a processing component that is capable of executing instructions related to the actions described above. FIG. 21 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UE 800, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for a user equipment (UE), the method comprising:
   receiving, at the UE, an initial Session Initiation Protocol (SIP) Invite request, the initial SIP invite request including a session description protocol (SDP) offer allowing selection, by the UE, between an internet protocol (IP) bearer or a circuit-switched (CS) bearer;
   in response to the initial SIP Invite request, determining that a voice setting in the UE is one of "CS only," "CS preferred," "IMS only," or "IMS preferred;"
   in response to determining that the voice setting in the UE is one of "CS only," "CS preferred," "IMS only," or "IMS preferred," determining that the initial SIP Invite request is not acceptable based on the following scenarios:
      if the voice setting in the UE is determined to be "CS only," in response to determining that the UE has not performed a successful non-access stratum (NAS) combined attach procedure, determining that the initial SIP Invite request is not acceptable, wherein the successful NAS combined attach procedure attaches the UE to both a packet-switched (PS) core and to a circuit-switched (CS) domain;
      if the voice setting in the UE is determined to be "CS preferred:"
         if the IMS over PS session is not supported, in response to determining that the UE has not performed the successful combined attach procedure, determining that the initial SIP Invite request is not acceptable;
      if the voice setting in the UE is determined to be "IMS preferred," in response to determining that the UE has not performed the successful NAS combined attach prodcure and that the IMS over PS session is not supported, determining that the initial SIP Invite request is not acceptable; and
      if the voice setting in the UE is determined to be "IMS only:"
         if the IMS over PS session is not supported, determining that the initial SIP Invite request is not acceptable; and
   in response to determining that the initial SIP Invite request is not acceptable, sending a SIP response including an indication that the initial SIP Invite request is not acceptable.

2. The method of claim 1, wherein allowing selection between the IP bearer or the CS bearer comprises allowing selection of the IP bearer or the CS bearer for an audio session.

3. The method of claim 1, wherein the SIP response including the indication that the initial SIP Invite request is not acceptable comprises a SIP 606 (Not Acceptable) response.

4. The method of claim 1, wherein the SIP response including the indication that the initial SIP Invite request is not acceptable comprises a SIP 488 response.

5. A user equipment (UE) comprising:
   a memory; and
   a processor comprising processing hardware platform, wherein the processing hardware platform is configured to execute an instruction that is stored in the memory, the instruction causing the processor to:
      receive, at the UE, an initial Session Initiation Protocol (SIP) Invite request, the initial SIP Invite request including a session description protocol (SDP) offer allowing selection, by the UE, between an internet protocol (IP) bearer or a circuit-switched (CS) bearer;
      in response to the initial SIP Invite request, determine that a voice setting in the UE is one of "CS only," "CS preferred," "IMS only," or "IMS preferred;"
      in response to determining that the voice setting in the UE is one of "CS only," "CS preferred," "IMS only," or "IMS preferred," determine that the initial SIP Invite request is not acceptable based on the following scenarios:
         if the voice setting in the UE is determined to be "CS only," in response to determining that the UE has not performed a successful non-access stratum (NAS) combined attach procedure, determine that the initial SIP Invite request is not acceptable, wherein the successful NAS combined attach procedure attaches the UE to both a packet-switched (PS) core and to a circuit-switched (CS) domain;
         if the voice setting in the UE is determined to be "CS preferred:"
            if the IMS over PS session is not supported, in response to determining that the UE has not performed the successful combined attach procedure, determine that the initial SIP Invite request is not acceptable;
         if the voice setting in the UE is determined to be "IMS preferred," in response to determining that the UE has not performed the successful NAS combined attach procedure and that the IMS over PS session is not supported, determine that the initial SIP Invite request is not acceptable; and
         if the voice setting in the UE is determined to be "IMS only:"

if the IMS over PS session is not supported, determine that the initial SIP Invite request is not acceptable; and in response to determining that the initial SIP Invite request is not acceptable, send a SIP response including an indication that the initial SIP Invite request is not acceptable.

6. The user equipment of claim 5, wherein allowing selection between the IP bearer or the CS bearer comprises allowing selection of the IP bearer or the CS bearer for an audio session.

7. The user equipment of claim 5, wherein the SIP response including the indication that the initial SIP Invite request is not acceptable comprises a SIP 606 (Not Acceptable) response.

8. The user equipment of claim 5, wherein the SIP response including the indication that the initial SIP Invite request is not acceptable comprises a SIP 488 response.

* * * * *

UNITED STATES PATENT AND TRADEMARK OFFICE
CERTIFICATE OF CORRECTION

PATENT NO. : 10,477,607 B2
APPLICATION NO. : 12/826631
DATED : November 12, 2019
INVENTOR(S) : Adrian Buckley, Jan Hendrik Lucas Bakker and Stefano Faccin It is certified that error appears in the above-identified patent and that said Letters Patent is hereby corrected as shown below:

In the Claims

In Column 35, Line 61, delete "the IMS over PS session" and insert -- an IMS over PS session --, therefor.

In Column 36, Line 2, delete "prodcure" and insert -- procedure --, therefor.

In Column 36, Line 55, delete "the IMS over PS session" and insert -- an IMS over PS session --, therefor.

Signed and Sealed this
Fourteenth Day of January, 2020

Andrei Iancu
*Director of the United States Patent and Trademark Office*